United States Patent [19]

Nakashima et al.

[11] Patent Number: 5,273,657
[45] Date of Patent: Dec. 28, 1993

[54] PROCESS FOR PREPARING MODIFIED POROUS MEMBRANE

[75] Inventors: Naoki Nakashima, Okayama; Tadaaki Miyano, Hyogo; Motoshi Ishikura, Hyogo; Yoshihide Ozawa, Hyogo, all of Japan

[73] Assignee: Daicel Chemical Industries, Ltd., Japan

[21] Appl. No.: 623,650
[22] PCT Filed: Apr. 18, 1990
[86] PCT No.: PCT/JP90/00503
    § 371 Date: Dec. 11, 1990
    § 102(e) Date: Dec. 11, 1990
[87] PCT Pub. No.: WO90/12638
    PCT Pub. Date: Nov. 1, 1990

[30] Foreign Application Priority Data

| Apr. 18, 1989 | [JP] | Japan | 1-98551 |
| May 1, 1989 | [JP] | Japan | 1-112437 |
| May 10, 1989 | [JP] | Japan | 1-116817 |
| May 10, 1989 | [JP] | Japan | 1-116818 |
| Jun. 30, 1989 | [JP] | Japan | 1-169190 |
| Jun. 30, 1989 | [JP] | Japan | 1-169191 |
| Nov. 29, 1989 | [JP] | Japan | 1-310344 |
| Nov. 29, 1989 | [JP] | Japan | 1-310345 |

[51] Int. Cl.$^5$ .............................................. B01D 71/68
[52] U.S. Cl. ................................ 210/640; 210/651; 210/654; 210/500.41; 264/41
[58] Field of Search .................. 264/41, 49; 427/245, 427/246; 210/640, 638, 500.44, 651, 654; 428/376; 55/16, 158

[56] References Cited

U.S. PATENT DOCUMENTS

| 4,110,265 | 8/1978 | Hodgdon | 210/507 X |
| 4,711,907 | 12/1987 | Sterzel et al. | 521/30 X |
| 4,942,091 | 7/1990 | Umezawa et al. | 428/376 X |

Primary Examiner—Frank Spear
Attorney, Agent, or Firm—Weingram & Zall

[57] ABSTRACT

A modified porous membrane can be prepared by dissolving an aromatic polymer having a thioether group in an organic solvent, forming membrane of the aromatic polymer from the resultant solution by phase conversion and oxidizing the formed membrane. This modified porous membrane can effectively be utilized in a filtration method wherein ultrafiltration, reverse osmosis, fine filtration, gas separation, vapor permeation or pervaporation is conducted.

16 Claims, 3 Drawing Sheets

PROCESS FOR PREPARING MODIFIED POROUS MEMBRANE

BACKGROUND OF THE INVENTION

1. Field of the Invention

The present invention relates to a process for preparing a membrane comprised of an aromatic sulfone resin which has excellent heat and solvent resistance and is used for a selective permeability. The membrane of the present invention can be used for the separation of substances, for example, as a separating membrane and as a diaphragm for batteries.

2. Description of the Prior Art

The method of separating a substance through the use of a porous membrane having a selective permeability is generally called "membrane separation" and is widely utilized in various fields including desalination of sea water, production of pure water used in the electronics industry, processes for the food industry and treatment of industrial waste water. With diversification of the use of these membranes, a permselective membrane usable at a higher temperature in a wider pH range and capable of withstanding various kinds of chemical substances has become desired in the art. A porous membrane utilizing an aromatic polysulfone polymer as the membrane material and having excellent chemical resistance has been proposed in Japanese Patent Laid-Open No. 16381/1979. This porous membrane has been used as a permselective membrane or as a base membrane of a composite membrane. The above-described aromatic polysulfone polymer is characterized as being soluble in an aprotic polar organic solvent, etc. Thus a porous membrane could easily be prepared by dissolving said polymer in an organic solvent and forming a film from the resultant solution. Porous membranes may be made by a process called "phase conversion." Phrase conversion comprises processing a polymer solution by casting or the like and immersing the processed solution in a nonsolvent of said polymer, which is compatible with the solvent of said polymer solution, and allowing said solution to gel. By such a process it is possible to prepare a porous membrane having both a pore diameter suitable for the separation of the desired substance as well as asymmetric (anisotropic) membrane structure wherein the dense portion of the membrane surface (called an active layer where the separation is conducted) is supported by a structure called a porous layer comprising a network structure containing macrovoids, or the like which occupies a major portion of the membrane structure. The phrase conversion process is thus a very desirable process and has been used extensively for preparing membranes.

The aforedescribed asymmetric membrane structure has very excellent features. In particular, the dense layer, which is provided with minute pores having a separatory function, is very thin and has a very high permeability to a liquid to be separated. The membrane also has a very high mechanical strength since the thin dense layer is supported by the thicker porous layer. This porous layer generally has no separatory function. These features ensure easy handling of the membrane in practical use.

Further, the phase conversion method is used to form a porous membrane partly because the structure and pore diameter of the porous membrane can be adjusted according to the substance to be separated and the separation system by varying several parameters, such as the composition of the polymer solution, the composition of the immersion bath and the solvent to be evaporated [see "Maku ni yoru Bunriho (Method of Separation by Means of Membrane) edited by Bunji Hagiwara and Koichi Hashimoto, pp. 25–41, Kodansha Scientific (1974)].

For the production of porous membranes having enhanced characteristics, proposals have been made to use a membrane material comprising a polymer which barely dissolves or swells in an organic solvent; for example, engineering plastics having excellent heat and solvent resistances, such as a fluoropolymer described in Japanese Patent Publication No. 25332/1983, and a polyphenylene sulfide described in Japanese Patent Laid-Open Nos. 202659/1985 and 213813/1987. Since there is no solvent capable of completely dissolving these polymers, the porous material used to make these porous membranes must be prepared by a complicated method of melt molding at high temperatures, stretching after the molding, or extraction of additives; all requiring apparatus of a large size. Further, the structures and kinds of porous materials which can be produced are limited.

In the case of polyphenylene sulfone, although it is a polymer having excellent heat and chemical resistances, it can not be molded into a structurally useful porous membrane due to its high melting point and solvent resistance. Japanese Patent Publication No. 35370/1985 and Japanese Patent Laid-Open Nos. 213813/1987 and 225636/1988 propose the use of the above-described aromatic polyphenylene sulfone as a material for a porous membrane instead of an aromatic polysulfone polymer. An intended microporous molding, comprising an aromatic polyphenylene sulfone, is prepared by melt-molding the above-described polyphenylene sulfide, which is hardly soluble in an organic solvent and then chemically modifying the microporous molding. Therefore, although the above-described porous material per se has very excellent heat and chemical resistances, the structure and separatory function are substantially determined when molding the polyphenylene sulfide, which thus limits the structure and kind of aromatic polyphenylene sulfone which can be prepared. Therefore, as opposed to porous membranes prepared from the conventional polymer solution, this process produces membranes having only limited uses.

An asymmetric membrane has a structure wherein a very thin active layer is backed with a spongy support layer. After the benefits and advantages were of such a structure were recognized, numerous studies on the composite membrane were initiated. The objects of some of these studies was to prepare an asymmetric membrane by combining two types of polymers. The disadvantage of this such a process are that -two adjustment steps are required. The advantages are, however: (1) you can separately select materials suitable for an active layer and a support layer, (2) the active layer and the support layer can each be prepared by suitable methods, and (3) the thickness and porosity of the active layer can readily be regulated according to the application.

Studies on such composite membranes have become popular because the above-described aromatic polysulfone polymer was found to be an excellent support membrane material. Since polysulfone has excellent heat resistance, the active layer can be prepared on polysulfone by direction polymerization. At present, the common practice is to use the aromatic polysulfone polymer after reinforcement backing comprising a nonwoven fabric or the like is applied.

The aromatic polysulfone polymer used for preparing several composite membranes has been a driving force for the development of the composite membrane. However, excessive reliance on the support has inhibited the development of the composite membrane. Specifically, the aromatic polysulfone polymer is attacked by commonly used solvents, esters and ketones, so that the polymer material used for preparing the active layer is limited [see "Saikin no makuho tansuika gijutsu to atarashii datsuenyo maku (Recent Desalination Technique by Means of Membrane and New Desalination Membrane)", Chiyoshi Kamisawa, Maku (Membrane), 5 (6), 348-356 (1980)].

Japanese Patent Laid-Open No. 136107/1984 proposes a resin having a three dimensional structure as a membrane material having excellent chemical, solvent and heat resistances, mechanical strengths, etc. Specifically, this patent proposes a process for preparing a porous membrane having a three dimensional structure which comprises: (1) dissolving a resin partially containing a photosensitive group in a suitable solvent to prepare a solution, (2) forming a porous membrane from the solution, and (3) irradiating the porous membrane with light for crosslinking. This patent teaches that the porous membrane comprising a resin having a three-dimensional structure provides an ideal support for a composite membrane. However, it is difficult: (1) to complete the photoinduced crosslinking reaction, which renders the proposed method unsuitable for a continuous production of the porous membrane, and (2) to advance the crosslinking reaction into a depth of the membrane. Also irradiation with light from both sides of the membrane is necessary to insolubilize the membrane as a whole, thus rendering this method unsuitable for membranes which are tubular or hollow. Further, to effectively conduct the photo-induced crosslinking reaction, a sensitizer is usually used, which affects the function of the membrane. For example, the ultrafiltration performances (such as permeation flow rate and percentage solute cut-off) vary depending upon the kind and amount of sensitizer added. This membrane is also disadvantageous in that it slightly shrinks when subjected to the photo-induced crosslinking reaction and brings about a change (in many cases a lowering) in the membrane performance of, e.g., ultrafiltration. This membrane performance cannot be restored unless the membrane is treated by immersion in methanol or acetone.

Swiss Patent Nos. 491981 and 501028, U.K. Patent No. 1402314 and Japanese Patent Laid-Open No. 210130/1988 disclose polyaromatic sulfones.

OBJECTS AND SUMMARY OF THE INVENTION

Accordingly, an object of the present invention is to provide a simple process for preparing a porous membrane of an aromatic sulfone resin having an excellent solvent resistance combined with an excellent heat resistance.

Another object of the present invention is to provide an asymmetric porous membrane of an aromatic sulfone resin having an asymmetric structure which has an enhanced separatory function.

A further object of the present invention is to provide a support membrane for a composite membrane comprising an aromatic sulfone resin having an excellent solvent resistance combined with an excellent heat resistance.

A still further object of the present invention is to define a process for preparing a support membrane for a composite membrane comprising an aromatic sulfone resin having an excellent solvent resistance combined with an excellent heat resistance.

Other objects and advantages will be apparent from the following description of the invention wherein the novel features of the invention will be particularly pointed out hereinafter in the claims.

Generally, the aforedescribed objects and advantages are achieved through a process for preparing a modified porous membrane which comprises dissolving an aromatic polymer having a thioether group in an organic solvent, forming a membrane of said aromatic polymer from the resultant solution by phase conversion and oxidizing the formed membrane.

BRIEF DESCRIPTION OF THE DRAWINGS

FIGS. 1 and 2 are scanning electron photomicrographs of an asymmetric porous membrane prepared in Example 1, wherein FIG. 1 shows the surface structure of the membrane ($\times 50,000$) while FIG. 2 shows the cross-sectional structure of the membrane ($\times 500$).

DETAILED DESCRIPTION OF THE INVENTION

Figure 1:
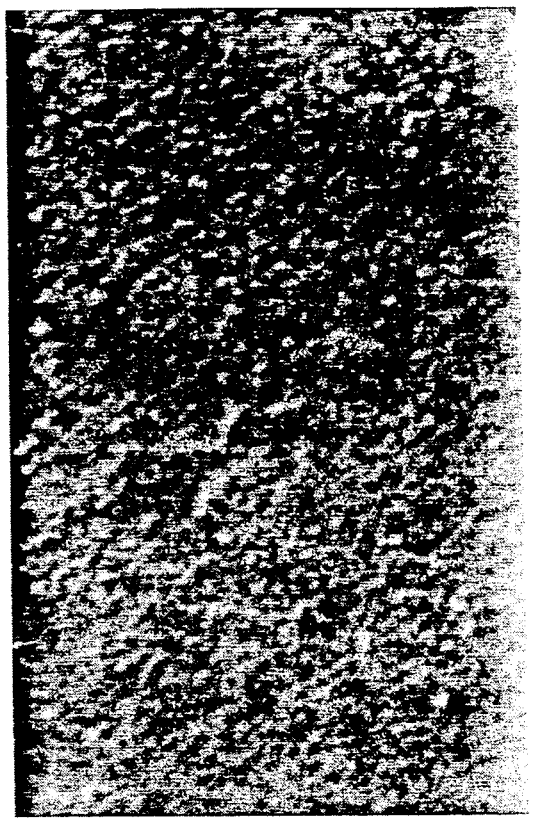

The present inventors have noted the above-described discrepancy on the solubility of the membrane material and have conducted intensive studies on the preparation of a precursor porous membrane. These studies have focused on the use of a precursor polymer capable of being easily formed into a membrane and which is soluble in an organic solvent, followed by conversion of the precursor polymer into an intended aromatic sulfone resin without breaking the membrane structure. As a result, the present inventors have surprisingly found that the oxidation of a porous membrane prepared from an organic polymer having a thioether group soluble in an organic solvent produces an intended membrane comprising an aromatic sulfone resin without breaking the membrane structure of the precursor. Further, the above-described oxidation is also useful in an asymmetric porous membrane having a higher order of a membrane structure prepared by the phase conversion.

The present invention relates to a process for preparing a porous membrane which comprises dissolving an aromatic polymer having a thioether group in an organic solvent, forming a membrane of the aromatic polymer from the resultant solution by phase conversion and oxidizing the formed membrane to prepare a porous membrane.

It is also possible to prepare a membrane comprising the above-described aromatic polymer and other polymer through dissolution of said other polymer and the said aromatic polymer in an organic solvent.

The oxidation treatment may be conducted through liquid phase oxidation with percarboxylic acid or an oxidizing agent system capable of forming a percarboxylic acid in a solvent which does not dissolve an aromatic polymer.

After the oxidation treatment, the membrane may further be stabilized with a nonsulfur reducing agent.

The membrane prepared by the phase conversion has an asymmetric structure in the cross-section in the direction of its thickness such that at least one surface of the membrane has a dense layer with a thickness of 10 $\mu$m or less and comprising micropores having an average pore diameter of 1 $\mu$m or less. The inside of the membrane has at least one porous layer which has an average pore diameter at least twice that of the average pore diameter of the dense layer and a thickness at least twice than that of the thickness of the dense layer.

A membrane prepared by the phase conversion method has, in the direction of its thickness, such a cross-sectional structure that both surfaces have micropores with a maximum pore diameter of 0.05 $\mu$m or more and the inside thereof has a network structure. The membrane may have a multi-layered structure wherein a porous layer containing macrovoids with pore diameters ten times larger than the average diameter of pores present on the skin layer, is present in the internal network structure.

When the membrane has a hollow fiber form, it is preferred that the internal surface and the external surface of the hollow fiber membrane have a skin layer whose pores have an average pore diameter suitable for the application. In this case, the average pore diameters of both need not be the same.

The above-described aromatic polymer includes one mainly composed of repeating units represented by the general formula:

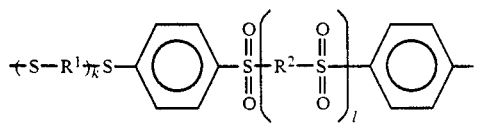

(I)

wherein $R^1$ and $R^2$ are each a phenylene group or a diphenylene group, k is 0 or an integer of 1 to 10 and l is 0 or 1. Further, the aromatic polymer may comprise repeating units represented by any of the following formulae (a) to (c):

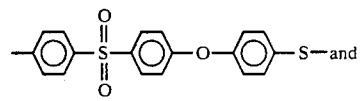

(a)

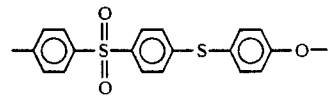

(b)

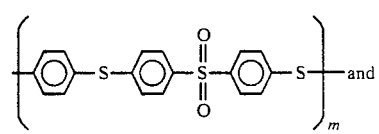

-continued

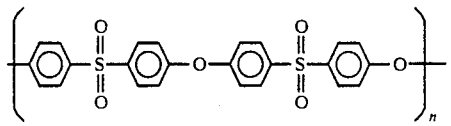

wherein $1 \leq \frac{m \times 100}{m+n} \leq \frac{200}{3}$.

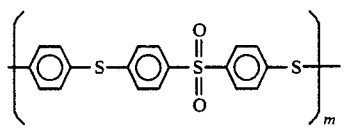

wherein m is an integer of 100 or less.

The present invention provides a porous membrane prepared by the above-described process. This membrane is substantially insoluble in an organic solvent.

The aromatic polymer of the membrane subjected to the oxidization treatment comprises repeating units represented by the general formula:

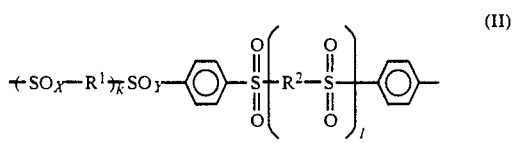

(II)

wherein $R^1$ and $R^2$ are each a phenylene group or a diphenylene group, X and Y are each 0, 1 or 2, k is 0 or an integer of 1 to 10 and l is 0 or 1, provided that a plurality of X's may be independently different numbers, and the content of the sulfone group among $SO_X$ group and $SO_Y$ group is at least equivalent to the total content of the thioether group and the sulfoxide group.

The aromatic polymer of the membrane subjected to the oxidation treatment comprises repeating units represented by any of the formulae (d) to (f):

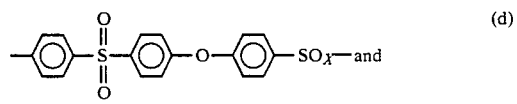

(d)

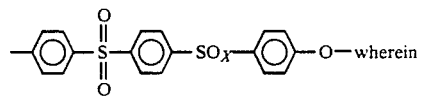

X is 0, 1 or 2 and the average value of X is 1.5 or more.

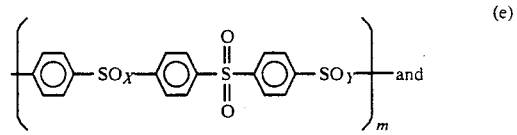

(e)

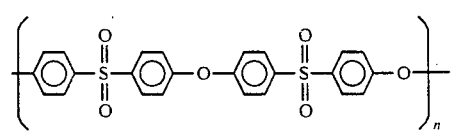

wherein X and Y are 0, 1 or 2 and the average values of X and Y are each 1.5 or more and $$1 \leq \frac{m + 100}{m + n} \leq \frac{200}{3}.$$

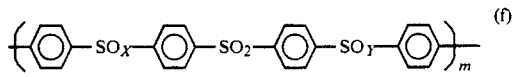 (f)

wherein X and Y are each 0, 1 or 2 and the average values of X and Y are each 1.5 or more and m is an integer of 100 or less.

The membrane may be in the form of a flat membrane, a cylindrical membrane, a hollow fiber membrane, or the like. This membrane per se can be used as a support membrane for a composite membrane. The membrane wherein an active layer of an organic polymer material is laminated onto at least one surface of the membrane.

These membranes, support membranes and composite membranes are used for filtration by ultrafiltration, reverse osmosis, fine filtration, gas separation, vapor permeation or pervaporation. Further, they can be utilized for the separation of substances and as a diaphragm for batteries, or the like.

The polymer of the membrane subjected to the oxidation treatment in the present invention can be represented also by the following formulae (1), (2), (5), (6) and (9).

The aromatic sulfone polymer of the present invention is a heat resistant polyphenylene sulfone resin, characterized by comprising constituent units represented by the following general formulae:

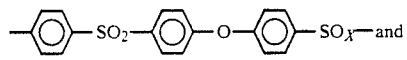 (1)

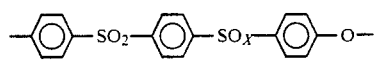 (2)

wherein X is 0, 1 or 2 and the average value of X is 1.5 or more, and can be prepared by oxidizing a linear polymer comprising constituent units represented by the following formula:

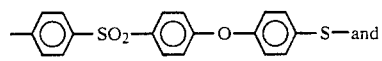 (3)

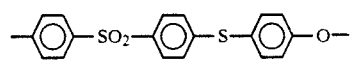 (4)

with an organic peracid in an aprotic organic solvent.

In the present invention, the linear polymer comprising the constituent units represented by the above-described formulae (3) and (4) can be prepared by, e.g., a method disclosed in Japanese Patent Publication No. 44954/1974 and a modification thereof.

Specifically, the linear polymer is prepared by heating 4-hydroxythiophenol and 4,4′-dichlorophenyl sulfone in an aprotic organic polar solvent in the presence of an alkali in an inert gas atmosphere at a temperature of 100° to 200° C. for a few hours, thereby conducting polycondensation. The linear polymer preferably used in the present invention has a reduced viscosity of 0.1 dl/g or more, preferably 0.15 to 1.8 dl/g as determined at 30° C. in the form of 0.5 g/dl solution in N-methyl-2-pyrrolidone.

The product intended in the present invention is prepared by oxidizing the above-described polymer with an organic peracid in an aprotic organic solvent to convert the —S— group into the —$SO_X$ group wherein X is 0, 1 or 2 and the average value of X is 1.5 or more. Examples of the organic peracid which may be used in the present invention include performic acid, peracetic acid, perpropionic acid, perbenzoic acid, pertrichloroacetic acid, pertrifluoroacetic acid and perphthalic acid. Among these, peracetic acid is preferred from the viewpoint of its reaction rate and handleability. The above-described organic peracids can be prepared by oxidizing an aldehyde in the presence of a catalyst, gas phase partial oxidation, synthesis from hydrogen peroxide and an anhydride or chloride of a carboxylic acid, a reaction of a diaroyl peroxide with sodium methoxide, or the like.

The amount of use of the organic peracid is preferably 1.5 to 5 mole per mole of the —S— group in the linear polymer comprising the constituent units represented by the above-described formulae (3) and (4).

Examples of the aprotic organic solvents usable in the present invention include ethyl acetate, methylene chloride, chloroform, chlorobenzene, dichlorobenzene, N,N-dimethylacetamide, N,N-dimethylformamide, N-methyl-2-pyrrolidone, 1,3-dimethyl-2-imidazolidinone, dimethyl sulfoxide and sulfolane.

In the present invention, the polymer comprising the constituent units represented by the formulae (3) and (4) is oxidized with an organic peracid in the substantial absence of water in an aprotic organic solvent system having a strong affinity for the polymer, so that sufficient oxidation can be attained. On the other hand, as opposed to the present invention, no sufficient oxidation can be attained in a watery system having a poor affinity for the polymer, for example, in a system wherein use is made of aqueous hydrogen peroxide. That is, in this case, no excellent heat-resistant polymer can be prepared.

The above-described conversion with an organic peracid can be attained by immersing a powder of the polymer comprising constituent units represented by the above-described formulae (3) and (4) in an aprotic organic solvent containing an organic peracid. Alternatively, the conversion can be attained either by pouring an organic acid or a solution thereof in the above-described solvent into a solution prepared by dissolving the above-described polymer in a soluble organic solvent, e.g., N,N-dimethylacetamide, N,N-dimethylformamide, N-methyl-2-pyrrolidone, 1,3-dimethyl-2-imidazolidinone, dimethyl sulfoxide, sulfolane, chlorobenzene or dichlorobenzene having a solid content of 40% by weight, or by pouring the above-described polymer solution into an organic peracid or a solution thereof in the above-described solvent. Conditions for the above-described treatment cannot always be limited because they vary depending upon the specific surface area, bulk density, and the like, of the powder, the reaction rate of the organic peracid, and similar factors. However, when use is made of a porous minute powder having a bulk density of 0.4 g/cm³ or less or when use is made of peracetic acid as in the solution method, a high conversion can be attained even at below room temperatures. Although the reaction temperature and the reaction time may vary depending upon the conditions, the reaction is usually conducted at 5° to 100° C. for 1 min to 2 weeks. After the reaction, separation is conducted by a conventional procedure to prepare an intended product.

The average value of the $-SO_X-$ group in the polymer according to the present invention was calculated on the basis of the yield of the polymer by the following equation.

$$X = 2 \times \left[ \left[ \frac{\text{(weight after oxidation)} - \text{(weight before oxidation)}}{\frac{\text{(weight before oxidation)}}{340}} \right] \times 16 \times 2 \right]$$

The aromatic polymer of the present invention is an aromatic sulfone polymer having an improved heat resistance, characterized by comprising constituent units represented by the following formulae:

$-Ph-SO_2-Ph-SO_X-Ph-SO_Y)_m$ (5)

$-Ph-SO_2Ph-O-Ph-SO_2-Ph-O)_n$ (6)

wherein X and Y are each 0, 1 or 2 and the average values of X and Y are each 1.5 or more, $-Ph-$ is a benzene nucleus bonded to the para position and $$1 \leq \frac{m \times 100}{m + n} \leq \frac{200}{3} .$$

This aromatic polymer can be prepared by oxidizing a linear polymer comprising constituent units represented by the following formulae:

$-Ph-SO_2-Ph-S-Ph-S)_m$ (7)

$-Ph-SO_2-Ph-O-Ph-SO_2-Ph-O)_n$ (8)

in an aprotic organic solvent with an organic peracid.

Further, the aromatic polymer of the present invention is an aromatic sulfone polymer having an improved heat resistance, characterized by comprising constituent units represented by the following formula:

$-Ph-SO_X-Ph-SO_2-Ph-SO_Y)_m$ (9)

wherein X and Y are each 0, 1 or 2 and the average values of X and Y are each 0 to 2, $-Ph-$ is a benzene nucleus bonded to the para position and m is an integer of 5 to 100. This aromatic sulfone polymer can be prepared by oxidizing a linear polymer comprising constituent units represented by the following formula:

$-Ph-S-Ph-SO_2-Ph-S)_m$ (10)

wherein $-Ph-$ is a benzene nucleus bonded to the para position and m is an integer of 5 to 100, in an aprotic organic solvent with an organic peracid.

The aromatic polymer used in the present invention is soluble in an organic solvent in a concentration of 2% by weight or more, preferably 10% by weight or more, has such a structure that its thioether group bonds an aromatic ring to another aromatic ring, and has no particular limitation in term of being soluble in an organic solvent, although it is preferred that the polymer have a sulfone group besides the thioether group. A polymer mainly composed of repeating units represented by the general formula (I) is particularly preferred as a membrane material for the above-described porous membrane for applications requiring a high heat resistance and an excellent solvent resistance. Examples of a polymer having a suitable solubility in an organic solvent and high availability include the aromatic polythioether sulfone polymers.

This aromatic polythioether sulfone can be prepared by a method described in U.S. Pat. No. 2,822,352, etc., i.e., by heating 1,4-benzenedithiol and 4,4'-dichlorodiphenyl sulfone in an aprotic polar organic solvent in the presence of an alkali, thereby conducting polycondensation.

Examples of another aromatic polymer having a thioether group usable in the present invention include those described in Japanese Patent Publication Nos. 19713/1970 and 8439/1976, and in U.S. Pat. Nos. 3354129 and 4125525.

The degree of polymerization of the aromatic polymer is sufficient to enable the polymer to have the capability of forming a film, and preferably, is sufficient to provide a molecular weight, in terms of the polyethylene oxide as determined by gel permeation chromatography of 10,000 or more, to provide for various properties, such as mechanical strength.

The porous membrane of the present invention (mainly composed of an aromatic polymer having a thioether group and soluble in an organic solvent) can be easily prepared by subjecting a solution of the polymer in an organic solvent to casting, extrusion, spinning, or the like, at a temperature below the boiling point of the solvent to form an intended shape. Then the molding is subjected to a treatment such as immersion in a nonsolvent of the polymer, which is compatible with the solvent component, to extract the solvent component.

The concentration of the polymer is such that 5 to 90 parts by weight (preferably 10 to 35 parts) of the polymer is homogeneously dissolved in 100 parts by weight of the solvent at a temperature not higher than the boiling point of the solvent used. The organic solvent used may be a general one, and there is no particular limitation thereon. An aprotic polar organic solvent, preferably one comprising at least one-member selected from among N,N-dimethylformamide, N,N-dimethylacetamide, N,N-dimethylimidazolidinone, 2-pyrrolidone, N-methyl-2-pyrrolidone, dimethyl sulfoxide and sulfolane may be favorably used. However, it is also possible to form a membrane from a heterogeneous solution prepared by adding and suspending a pore forming agent capsule which can be easily extracted after the formation of a membrane, such as a finely divided silica powder, in the above-described homogenous polymer solution.

In particular, an asymmetric porous membrane or a membrane having a high porosity can be prepared by the so-called phase conversion method. This membrane is prepared by molding the above-described polymer solution in a nonsolvent of the polymer, which is compatible with the solvent component, to bring about a microphase separation and, simultaneously, with or after the phase separation, extracting the solvent component to cause gelation.

The phase conversion method is particularly preferred because the structure of the porous membrane and the average pore diameter of the dense layer (particularly the diameter and the distribution of the fine pores of the active layer participating in the separation) can be adjusted to separate a substance by evaluating various factors such as the composition of the polymer solution, the composition of the immersion bath and the evaporation of the solvent. Swelling agents and nonsolvents of the polymer (such as inorganic salts, low molecular organic materials, and high molecular additives) may be added as an additive to effectively conduct the phase conversion and facilitate the casting, or the like. There is no particular limitation on the immersion bath comprising a nonsolvent of the polymer as long as it is a liquid capable of allowing the polymer solution to gel. The immersion bath may comprise water, various aqueous solutions, alcohols or the like. If necessary, it may contain solvents and swelling agents of the polymer as an additive.

In the case of a hollow fiber membrane, it is particularly preferred that the gelation of the inside of the hollow fiber be conducted by making use of a liquid different from that used for gelation of the outside of the hollow fiber from the viewpoint of forming a necessary asymmetric structure. The step of molding the polymer solution into an intended shape through casting or the like is conducted at a temperature no higher than the boiling point of the solvent component and usually at a temperature close to room temperature. The solution may be heating as long as the temperature is not higher than the boiling point of the solvent component.

There is no particular limitation on the porous membrane prepared by the above method as long as the membrane has micropores interconnected to each other and the porosity is 30 to 95%. However, when the practical membrane strength and membrane characteristics are taken into consideration, it is preferred that the porosity be 40 to 90%.

That the porous membrane has an asymmetric structure is very preferred from the viewpoint of the separation characteristics of the intended porous membrane of an aromatic sulfone resin. The porous membrane favorably used in the present invention is one mainly composed of an aromatic polymer: (1) having a thioether group and soluble in an organic solvent, (2) having in the direction of its thickness such an asymmetric cross-sectional structure that at least one surface of the membrane has a dense layer with a thickness of 10 $\mu$m or less and comprising micropores with an average pore diameter of 1 $\mu$m or less, and (3) wherein the inside of the membrane has at least one porous layer with an average pore diameter at least twice larger than that of the dense layer and a thickness at least twice larger than that of the dense layer, or wherein the inside of the membrane has, in the direction of its thickness, such a cross-sectional structure that both surfaces have micropores with a maximum pore diameter of 0.05 $\mu$m or more and the inside thereof has a network structure.

The term "oxidation treatment", as used in the present invention, is intended to mean that when a porous membrane of an aromatic polymer having a thioether group and soluble in an organic solvent is chemically treated, the membrane is chemically modified into an intended aromatic sulfone resin without breaking the membrane structure. Examples of favorable oxidation treatment include liquid phase oxidation wherein the porous membrane is brought into contact with a solution which contains an oxidizing agent and which does not dissolve the polymer.

The above-described oxidation treatment is attained by bringing the porous membrane into contact with an oxidizing agent solution at a temperature not higher than the boiling point of the solvent, preferably at a temperature between room temperature and 70° C. for 1 min or longer, preferably 5 min to 10 hr. Various oxidizing agent solutions can be used for the oxidation treatment. The oxidation treatment in the present invention, however, can be attained by any method, and an oxidation treatment method other than the liquid phase oxidation may be used depending upon the intended asymmetric porous membrane. In the above-described liquid phase oxidation, an aqueous solution or an organic solvent solution of inorganic oxidizing agents (such as hydrogen peroxide, periodic acid or permaorganic acid) or of organic oxidizing agents (such as performic acid, peracetic acid, perpropionic acid, perbutyric acid, perbenzoic acid, pertrichloroacetic acid or perphthalic acid) may be used as the oxidizing agent solution. Among these, immersion in an organic acid or ester solution of peracetic acid is particularly preferred from the viewpoint of the selectivity, rate of the reaction, and handleability. The amount of use of the oxidizing agent may be at least equivalent to that of the thioether group contained in the aromatic polymer having a thioether group and preferably a large excess, i.e., 2 to 100 equivalent excess. The oxidizing agent concentration of the treating solution varies depending upon the combination of the oxidizing agent with the solvent. For example, in the case of an ethyl acetate solution, the peracetic acid concentration is favorably 5 to 30% by weight.

There is no particular limitation on the solvent used in the oxidizing agent solution as long as the solvent is compatible with the oxidizing agent and does not dissolve the polymer. However, it is preferred to use solvents having a suitable affinity for the polymer, such as acetic acid or ethyl acetate.

In the porous membrane of an aromatic polymer having a thioether group and soluble in an organic solvent used in the process of the present invention, the inside pores are filled with a liquid used for the extraction of the organic solvent, so that the oxidation treatment and accompanying auxiliary treatments are conveniently conducted without drying the membrane. In some cases, replacement of the liquid inside the pores with a solvent for the oxidizing agent is preferred as a pretreatment of the oxidation, and a solvent substitution method is conveniently used for this purpose. The membrane may be dried once, before use, depending upon the intended porous membrane.

Subsequently, the membrane is sufficiently washed with a solvent without drying to complete the oxidation treatment. In this case, it is suitable to repeat only washing by water or a combination of washing by water with washing by a solvent such as an alcohol. If necessary, post-treatments, may be additionally conducted.

Sodium hydrogen sulfite, sodium thiosulfate, or the like, have been used for the decomposition of an unreacted oxidizing agent. However, the use of these sulfur reducing agents forms, through a redox reaction, colloidal sulfur which is insoluble in water and an organic solvent. The colloidal sulfur remains in the pores of the porous membrane or makes the redox reaction insufficient, this action renders the sulfur reducing agents unsuitable in the present invention.

A ferrous ion and a stannous ion are preferably used as the reducing agent in the stabilization in the present invention. Examples thereof include ferrous sulfate, ammonium ferrous sulfate, ferrous citrate and stannous chloride. They may be used in combination with chelating agents such as oxalic acid, lactic acid, citric acid, tartaric acid or disodium ethylenediaminetetraacetate.

After the above-described post-treatment, it is also possible to replace the liquid filling the inside pores of the porous membrane with a liquid containing a germicide, an antifreezing agent, or with a wetting agent such as glycerin or a surfactant. It is also possible to dry the porous membrane after washing or after the above-described post-treatment depending upon the intended application.

The above-described treatment wherein the liquid phase oxidation is conducted without drying the porous membrane is a favorable oxidation treatment which can chemically modify the constituent polymer while substantially maintaining the structure and separation characteristics of the porous membrane to be treated. The oxidation treatment of the porous membrane used in the present invention can be attained by any method, and an oxidation treatment wherein use is made of a dried membrane may be selected according to the intended porous membrane.

According to the process of the present invention, the porous membrane can be prepared in the form of a porous membrane alone or a fabric-backed membrane. This fabric-backed membrane comprises a porous membrane integrated with a support such as a nonwoven fabric and a porous membrane shape selected from among a hollow fiber membrane, a flat membrane or a tubular membrane, depending upon the application. However, the present invention is not limited to these configurations only.

From the viewpoint of the heat and solvent resistances, it is preferred that the aromatic sulfone resin constituting the porous membrane prepared by the process of the present invention have: (1) in its polymer structure, 80% by weight, or more, of repeating units represented by the above-described general formula (II), and (2) a sulfone group among the sulfur-containing functional groups constituting the polymer which is at least equivalent to the total content of a thioether group and a sulfoxide group.

In the above-described general formula (II), part of the benzene rings may have substituents such as hydroxyl and sulfo groups. Further, it is also possible for the resin to have an ether group in part of the structure or to contain other ingredients in the above-described amount range. Such other ingredients may include a polymer constituting unit or a membrane constituting element for the purpose of improving the characteristics of the porous membrane. Further, the polymer may have a crosslinked structure.

Preferred because of its extraordinary excellent heat and solvent resistances, is an aromatic polyphenylene sulfone wherein 90% by weight, or more, of the above-described membrane-constituting element comprises a polymer consisting of repeating units represented by the general formula (wherein X and Y are each

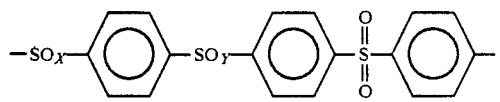

0, 1 or 2) and the content of a sulfone group among sulfur-containing functional groups constituting the polymer is at least four times higher by equivalent than the total content of a thioether group and a sulfoxide group.

The above-described porous membrane also has such an excellent solvent resistance that it neither dissolves nor swells in not only general organic solvents (such as hydrocarbons, halogenated hydrocarbons, aromatic hydrocarbons, nitrogen compounds such as amines, alcohols, ethers, esters, organic acids, acid anhydrides and ketones) but also in aprotic polar organic solvents commonly used as a solvent for polymers (such as N,N-dimethylacetamide, N-methyl-2-pyrrolidone and dimethyl sulfoxide). Further, this porous membrane can withstand an attack by a strong acid or alkali. It also has such a very high heat stability that the glass transition point of the polymer constituting the membrane is 300° C. or above.

Further, it is very preferred that the porous membrane of the aromatic sulfone resin have an asymmetric structure. A porous membrane having such an asymmetric cross-sectional structure in the direction of its thickness so that at least one surface of the membrane has an active layer and a dense layer having a thickness of 10 $\mu$m, or less, and comprising micropores having an average pore diameter of 1 $\mu$m, or less (preferably a dense layer having a thickness of 1 $\mu$m, or less, and comprising micropores having an average pore diameter of 0.1 $\mu$m, or less), and the inside of the membrane has at least one porous layer with an average pore diameter at least twice larger than that of the dense layer and a thickness at least twice larger than that of the dense layer, is suitable for use in filtration by ultrafiltration, reverse osmosis, gas separation, vapor permeation or pervaporation. Further, a porous membrane having such a cross-sectional structure in the direction of its thickness so that both surfaces have micropores with a maximum pore diameter of 0.05 $\mu$m, or more, and the inside thereof has a network structure, is suitable for use in fine filtration. The smaller the average pore diameter and thickness of the dense layer present on the surface of the membrane [including the active layer where the separation is conducted as compared with those of the porous layer supporting the dense layer, i.e., the greater the asymmetry (anisotropy) of the membrane structure], the more desirable the structure of the separating membrane. Therefore, it is preferred that the porous membrane of the present invention, have such a multi-layered structure so that contiguous to the dense layer, the average pore diameter of the porous layer is at least twice larger than that of the dense layer and that said average pore diameter gradually increases in the direction of the thickness of the membrane. Further, the asymmetric porous membrane may have a multi-layered structure wherein a porous layer containing macrovoids with a pore diameter at least ten times larger than the average pore diameter of the dense layer, is present. The dense layer may be present on both surfaces of the membrane. When the above-described membrane has a hollow fiber form, it is desired that the internal surface and the external surface of the hollow fiber membrane each have a dense layer with an average pore diameter appropriate for application. In any case, it is not necessary for the average pore diameters of both dense layers to be the same. The structure, which is asymmetric with respect to the center of the cross section, may be symmetrical towards the surface. Further, the structure of the asymmetric porous membrane of the present invention is not limited to the above-described exemplification as long as the above-described membrane has an asymmetric structure in the direction of its thickness.

As described above, since the asymmetric porous membrane of the present invention has such an asymmetric structure that the thickness of the dense layer (provided with minute pores having a separatory function) is very thin, the membrane has a very high permeability to a liquid to be separated. Further, the membrane has very high mechanical strength since the dense layer is supported by a porous layer with no separatory function, thus, the membrane can be easily handled in practical use.

When the above-described porous membrane is used as an ultrafiltration membrane, its cut-off molecular weight and pure water permeability are 500,000 or less, preferably 1,000 to 300,000 and 0.1 m$^3$/m$^2$·lg/cm$^2$· day or more, preferably 1.0 m$^3$/m$^2$·kg/cm$^2$· day or more, respectively. However, when non-aqueous solutions are treated, the membrane exhibits a performance different from the exemplified separation characteristics depending upon the viscosity of the liquid, the state of dissolution of the solute, and similar factors. Further, the exemplified separation characteristics do not limit the structure of the above-described asymmetric porous membrane.

The term "cut-off molecular weight of the membrane" as used herein means that the diameter and distribution of fine pores participating in the separation have a capability of cutting off 95%, or more, of an indicator solute having such a molecular weight. The porous membrane is usually used as a separating membrane by feeding a pressurized liquid to be separated to the side of the dense layer. Alternatively, the pressurized liquid may be fed to the surface side having a coarse skin layer. Further, the gas and liquid phase states of a liquid to be separated are not limited in any case. Further, a driving force for separation other than the pressure difference may be applied, and the membrane may be used simply as a partition wall.

The asymmetric porous membrane of the present invention may be used alone as a porous membrane, or as a fabric-backed membrane comprising a porous membrane integrated with a support such as a nonwoven fabric in the form of a hollow fiber membrane, a flat membrane, a tubular membrane, or the like. The form may be arbitrarily selected depending upon the intended application of the porous membrane. However, the present invention is not limited to these exemplifications only.

The present invention provides a simple process for preparing a porous membrane of an aromatic sulfone resin which has an excellent solvent resistance, an excellent heat resistance, and a better separatory function. Specifically, the present invention provides an excellent process for preparing a porous membrane having in combination: (1) an excellent solvent resistance, (2) an excellent heat resistance, (3) no necessity for conventional melt molding at a high temperature nor stretching after the molding, (4) no necessity for the extraction of an additive through oxidation, (5) easy preparation of a porous membrane from a solution of a polymer in an organic solvent, said membrane having structure and a pore diameter controlled as desired. As opposed to such a porous membrane prepared from a solution of a polymer in an organic solvent, the conventional porous material with high heat and solvent resistances has limited application due to its limited structure and type.

Further, according to the present invention, it is possible to prepare highly heat- and solvent-resistant asymmetric porous membranes: (1) having a very excellent membrane structure with a high separation capability due to the minute pores formed in the active layer of the membrane and the uniform pore diameter distribution, (2) having a very high permeability of the membrane to a liquid to be separated due to the very thin dense layer provided with minute pores having a separatory function, and (3) that can easily be handled in practical use by virtue of excellent mechanical strengths because the dense layer is supported by a porous layer having no separatory function.

For these reasons, the porous membrane of the aromatic sulfone resin prepared by the process of the present invention is expected to have very high performance in various applications where it is difficult or impossible to apply the membrane separation technique due to the limited solvent and heat resistance of a conventional separating membrane comprising an organic polymer. Specifically, the membrane comprising an organic polymer. Specifically, the membrane of the present invention is expected to be used as a high-performance porous membrane in a wide variety of applications such as in: (1) concentration, recovery and purification processes in the medical, pharmaceutical, biochemical and food industries; (2) concentration, recovery and purification processes in the fats and oils, petrochemical and paint industries where an organic solvent and highly concentrated acid and alkali are treated with a membrane; (3) obtaining a high degree of purification of various reagents for the electronics industry, battery separators, various filters, and for the treatment of waste water containing organic solvents.

In particular, the membrane of the present invention is expected to be used as a base material of a high-performance membrane or as a constituent of a composite membrane for applications such as: (1) gas separation where a high-temperature operation is required; and (2) pervaporation and vapor permeation where a solvent resistance at high temperature operation is required; and (2) pervaporation and vapor permeation where a solvent resistance at a high temperature, in addition to operation at a high temperature, is required.

The above-described porous membrane of the aromatic polysulfone resin is used very favorably as a support for a composite membrane. This composite membrane can also be prepared by coating the porous membrane with an active layer participating in the separation.

There is no particular limitation on the polymer for forming an active layer. For example, the polymer can be selected from among cellulose acetate, polyamide, polyurea, polyamide, polyamide-imide, sulfonated polysulfone, or the like, according to the application.

Examples of the method of coating the porous membrane with an active layer, as known in the art, include (a) a method which comprises applying a polymer solution to the porous membrane and then removing the solvent through evaporation; (b) a method which comprises applying a polymerizable monomer (or its precursor) to the porous membrane or immersing the porous membrane in the polymerizable monomer and then applying a heating or chemical treatment for polymerization or crosslinking; and (c) a method wherein an interfacial polymerization is conducted on the porous membrane. Any method may be applied in the preparation of the support for the composite membrane.

The support membrane for a composite membrane in the present invention may be in the form of a hollow filament membrane, a flat membrane, a tubular membrane, or the like. This form may be arbitrarily selected depending upon the application. The present invention is not limited to these exemplifications only.

The support membrane for the composite membrane of the present invention is most desirably one having excellent solvent resistant, particularly one insoluble in organic solvents. There is no particular limitation on the solvent used in the formation of the active layer coating. Since the porous membrane has excellent resistance as well, heating can be conducted at a temperature above that of the conventional polysulfone support when heat treatment is necessary for coating the membrane with an active layer. Therefore, the use of the support for a composite membrane of the present invention widens the range of selection of the polymer for forming an active layer.

Further, when a polymer having excellent solvent and heat resistance is selected as a polymer for forming an active layer, the whole composite membrane will also have excellent solvent and heat resistance. The above-described composite membrane can be used in such fields as concentration and separation of organic liquids, gas separation where a high-temperature operation is necessary, and pervaporation and vapor permeation where the solvent resistance at a high temperature is required in addition to the operation at a high temperature.

EXAMPLES

The present invention will now be described in more detail by way of examples, which should not be construed as limiting the scope of the present invention.

REFERENTIAL EXAMPLE 1

A 1-1 flask equipped with an agitator, a nitrogen inlet tube, a thermometer and a condenser having a receiver was charged with 43 g of 1,4-benzenedithiol, 88 g of 4,4'-dichlorodiphenyl sulfone, 48 g of anhydrous sodium sulfate and 400 g of 1,3-dimethyl-2-imidazolidinone. A nitrogen gas was introduced under agitation to purge the reaction system therewith.

Then, the temperature of the system was raised to the boiling point of 1,3,-dimethyl-2- imidazolidinone, and the agitation was continued for one hour. Thereafter, the temperature was lowered to 100° C., and a methyl chloride gas was blown into the system for 30 min at a flow rate of 300 ml/min to complete the reaction. A filtrate obtained by removing solid matter from the reaction mixture was poured into methanol to precipitate the polymer thus produced. The precipitate was further washed with methanol and dried to give 108 g of polymer.

Infrared absorption spectroscopy and proton nuclear magnetic resonance spectroscopy of the polymer, thus prepared, have revealed that the polymer is an aromatic polythioether sulfone polymer comprising the following repeating units:

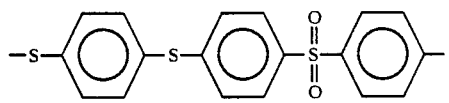

This polymer had a reduced viscosity of 0.50 dl/g as determined at 30.C in a 0.5 g/dl solution of N-methyl-2-pyrrolidone and a molecular weight of 20,000 in terms of standard polyethylene oxide as determined by GPC (gel permeation chromatography) through the use of N,N-dimethylformamide as an eluent.

EXAMPLE 1

20 parts by weight of the aromatic polythioether sulfone, prepared by Referential Example 1, was dissolved in 80 parts by weight of N-methyl-2-pyrrolidone while agitating at room temperature to prepare a homogeneous polymer solution. This solution was allowed to stand for degassing and then cast on a clean glass plate to form a film having a thickness of 150 $\mu$m. The film was allowed to stand for 30 sec and then immersed in water at 10° C. for gelation of the polymer solution, thereby preparing an asymmetric porous membrane having a thickness of 82 $\mu$m. This membrane was subjected to a permeation test by making use, as a feed solution, of either an aqueous solution of a bovine serum albumin (molecular weight: 66,000) dissolved in a concentration of 100 ppm in a 0.05M phosphate buffer, or a distilled water under a pressure of 3.0 kg/cm$^2$. It was observed that this membrane was a porous membrane having a pure water permeability of 1.44 m$^3$/m$^2$·kg/cm$^2$· day at room temperature and such a separation characteristic that 88% of the bovine serum albumin was cut off. This membrane was immersed in methanol at room temperature for 20 min and then in ethyl acetate for 20 min. Thereafter, the membrane was immersed in an ethyl acetate solution containing 30 parts by weight of peracetic acid for 7 hr to conduct an oxidation treatment. After the treatment, the membrane was removed and washed with methanol and water. Then, the membrane was washed with a 5% by weight aqueous ammonium ferrous sulfate solution and then a 1% by weight oxalic acid solution and further sufficiently washed with water.

The membrane subjected to only washing with water without conducting the above-described reductive stabilization treatment developed black spots upon being heated.

The porous membrane, thus prepared, was subjected to ESCA (electron spectroscopy for chemical analysis), elementary analysis and measurement of an increase in the weight of the membrane. The membrane, thus prepared, was a porous membrane of an aromatic polyphenylene sulfone wherein 90% or more of the sulfur-containing functional groups are sulfone groups. The polymer, constituting the above-described membrane, exhibited a glass transition point of 400° C. or above as determined by differential scanning calorimetry and did not dissolve any more in an organic solvent -pyrrolidone, dimethyl sulfoxide and N,N-dimethylacetamide.

This membrane was subjected to a permeation test in the same manner as that described above. It was found that this porous membrane exhibited a pure water permeability of 0.95 m$^3$/m$^2$·kg/cm$^2$· day at room temperature and such a separation characteristic that 92% of the bovine serum albumin was cut off. This demonstrates that the structure and separation characteristics of the precursor porous membrane were substantially maintained after the oxidation treatment.

This membrane was immersed in various organic solvents, acids and alkalis at room temperature for 5 days to evaluate the solvent resistance. When the organic solvent was poor in its compatibility with water, the evaluation was conducted after the membrane was subjected to a treatment wherein the membrane was completely wetted with the organic solvent by the solvent substitution method. In applying this method, use was made of ethanol, dimethyl ether or the like, the membrane was immersed in the organic solvent and then again converted into a water-containing membrane in a similar manner. In the evaluation, the water permeability and separation performance of the solute were measured before and after the immersion in the organic solvent to examine whether or not deterioration of performance occurred. Further, the membrane after immersion in an organic solvent, was taken out and then immediately subjected to measurement of the tensile breaking strength and elongation by making use of a tensilon. The results of these measurements were compared with those of unimmersed membrane to examine whether or not deterioration had occurred. The results are given in Table 1. The results confirmed that the asymmetric porous membrane underwent no change and had excellent solvent resistance.

Figure 2:
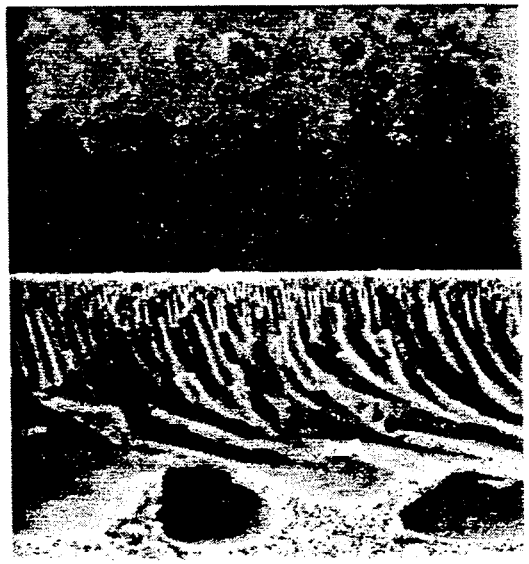

Scanning electron photomicrographs of the surface and cross section of the above-described membrane are shown in FIG. 1 and 2. As is apparent from FIG. 2, the membrane, a dense layer having an average pore diameter of 0.05 μm, or less, and a thickness of 0.5 μm or less present on the surface thereof and contiguously present under the dense layer, a porous layer having an average pore diameter of 0.2 μm, or more, and containing macrovoids having a pore diameter of 5 μm, or more, and a porous layer having an average pore diameter of 0.4 μm, or more. As shown in FIG. 1, no image suggesting the pressure of pores having a diameter of 0.02 μm or more was observed on the surface (the active layer side) of the membrane, so presumably, minute pores having a diameter smaller than 0.02 μm may be present on the surface of the membrane.

EXAMPLE 2

A porous membrane of an aromatic polyphenylene sulfone was prepared in the same manner as that of Example 1, except that in the oxidation treatment the time for immersion in the peracetic acid solution was varied to 1 hr and 2 hr. The membranes, thus prepared, were porous membranes comprising an aromatic polyphenylene sulfone wherein at least 80% and at least 85% of sulfur-containing functional groups contained therein were sulfone groups. None of the membranes dissolved in organic solvents such as dimethyl sulfoxide.

EXAMPLE 3

Porous membranes of an aromatic polyphenylene sulfone wherein at least 51% and at least 60% of the sulfur-containing functional groups contained therein were sulfone groups were prepared in a manner similar to that of Example 1. Instead of the oxidation treatment conducted in Example 1, the porous membrane of an aromatic polythioether sulfone was immersed at 35° C. for 3 hr in solutions prepared by mixing 30% by weight of aqueous hydrogen peroxide with glacial acetic acid in weight ratios of 1:1 and 1:2 and then sufficiently washed with water.

EXAMPLE 4

A porous membrane of an aromatic polyphenylene sulfone wherein at least 85% of sulfur-containing functional groups contained therein were sulfone groups was prepared in a manner similar to that of Example 1. Instead of the oxidation treatment conducted in Example 1, the porous membrane of an aromatic polythioether sulfone was immersed in methanol at room temperature only for 20 min and then similarly subjected to an oxidation treatment with a peracetic acid solution.

EXAMPLE 5

A porous membrane of an aromatic polyphenylene sulfone was prepared in a manner similar to that of Example 1. In the oxidation treatment for this example, the porous membrane was immersed in an ethyl acetate solution containing 10 parts by weight of peracetic acid at 40° C. for 3 hr. The membrane, thus prepared, was a porous membrane comprising an aromatic polyphenylene sulfone wherein 94% or more of the sulfur-containing groups contained therein were sulfone groups. This membrane did not dissolve in an organic solvent, such as dimethyl sulfoxide, and did not melt at 400° C., i.e., had extraordinary excellent solvent and heat resistance.

EXAMPLE 6

A 196 μm-thick fabric-backed porous membrane of an aromatic polyphenylene sulfone was prepared in a manner similar to that of Example 1. In this example, nonwoven polyester fabric having a thickness of 130 μm was used instead of the glass plate used in Example 1. This membrane was a porous membrane having a pure water permeability of 4.2 $m^3/m^2 \cdot kg/cm^2 \cdot$ day and such a separating characteristic that 88% of the bovine serum albumin was cut off.

The membrane sample was placed in an autoclave and then treated with hot water at 130° C. for 1 hr. No change was observed in the shape and separation characteristic of the membrane, i.e., it was confirmed that the membrane had an excellent heat resistance.

EXAMPLE 7

A supporting fabric-backed porous membrane of an aromatic polyphenylene sulfone having a thickness of 240 μm was prepared in a manner similar to that of Example 6. In this example, the amount of the polymer solution and the casting thickness were 23 parts by weight and 250 μm, respectively, instead of the polymer solution and a casting thickness of 150 μm used in Example 6. This membrane was a porous membrane having a pure water permeability of 0.85 $m^3/m^2 \cdot kg/cm^2 \cdot$ day and such a separation characteristic that 96% of the bovine serum albumin was cut off.

EXAMPLE 8

A supporting fabric-backed porous membrane of an aromatic polyphenylene sulfone was prepared in a manner similar to that of Example 7. Instead of the polymer solution used in Example 7, the polymer concentration was varied to 22 parts by weight and 1 part by weight of lithium chloride was added as an additive. This membrane was a porous membrane having a pure water permeability of 4.0 $m^3/m^2 \cdot kg/cm^2 \cdot$ day and such a separation characteristic that 85% of the bovine serum albumin was cut off.

COMPARATIVE EXAMPLE 1

A porous membrane of polyphenylene sulfide having a thickness of 35 μm and a porosity of 25% was prepared according to the Referential Example of Japanese Patent Laid-Open No. 213813/1987 by making use of polyphenylene sulfide (viscosity at 300° C.: 4000 P). Then, the porous membrane was oxidized in the same manner as that of Example 1 to prepare a porous membrane of an aromatic polyphenylene sulfone. As opposed to the asymmetric membrane structure prepared in the Examples, the obtained membrane had such a cross-sectional structure in the direction of its thickness that pores having an average diameter of 0.2 μm were randomly present. This membrane exhibited poor separation characteristics unsuitable for use as a separating membrane, i.e., exhibited no cut-off of the bovine serum albumin despite the fact that the pure water permeability was as low as 0.15 m$^3$/m$^2$·kg/cm$^2$· day.

COMPARATIVE EXAMPLE 2

An asymmetric membrane of polyether sulfone having a thickness of 65 μm was prepared according to the Example of the Japanese Patent Laid-Open No. 16381/1979. This membrane was an asymmetric porous membrane having in its cross-section in the direction of the thickness, a typical asymmetric membrane structure similar to that of the membrane prepared in the Examples and having such excellent separation characteristics that the pure water permeability was 6.5 m$^3$/m$^2$·kg/cm$^2$· day and 96% of the bovine serum albumin was cut off. This membrane was immersed in various organic solvents, acids and alkalis at room temperature for 5 days to evaluate the solvent resistance. The results are given in Table The membrane dissolved when immersed in aprotic polar organic solvents such as N,N-dimethylacetamide, N-methyl-2-pyrrolidone and dimethyl sulfoxide, and deteriorated even when immersed in general organic solvents such as acetone, benzene and chloroform. This result rendered the above membrane unsuitable as an organic solvent-resistant membrane.

EXAMPLE 9

12 parts by weight of the aromatic polythioether sulfone, prepared in Referential Example 1, and 2 parts by weight of polyethylene oxide having an average molecular weight of 900,000 (a product of Aldrich) were dissolved in 86 parts by weight of N-methyl-2-pyrrolidone while agitating at room temperature to prepare a homogeneous polymer solution. This solution was allowed to stand for degassing and then cast on a clean glass plate to form a film having a thickness of 300 μm. The film was allowed to stand in the atmosphere at room temperature for 100 sec and then immersed in 60 parts by weight of an aqueous N-methyl-2-pyrrolidone solution at 25° C. for gelation of the polymer solution, thereby preparing a porous membrane. The observation of the structure of the membrane under a scanning electron microscope revealed that the top surface had pores with a maximum diameter of 0.2 μm, the back surface (on the side of the glass plate) had pores with a maximum diameter of 0.5 μm and the inside of the membrane had a network structure with an average pore diameter of 0.3 μm. The pure water permeability of the membrane and the percentage cut-off of the polystyrene latex (particle diameter of 0.22 μm) were 20,000 l/m$^2$·hr·kg/cm$^2$ and 100%, respectively. This porous membrane was immersed in methanol at room temperature for 20 min and then in ethyl acetate for 20 min. Thereafter, the membrane was immersed in an ethyl acetate solution containing 30 parts by weight of peracetic acid for 7 hr to conduct an oxidation treatment. After the treatment, the membrane was removed and sufficiently washed with methanol and water.

The resultant porous membrane was subjected to ESCA (electron spectroscopy for chemical analysis), elementary analysis and measurement of the weight increase of the membrane. The membrane, thus prepared, was a porous membrane of an aromatic polyphenylene sulfone wherein 90% or more of the sulfur-containing functional groups are sulfone groups. The polymer constituting the above-described membrane exhibited a glass transition point of 400° C., or above, as determined by differential scanning calorimetry and did not dissolve further in an organic solvent such as N-methyl-2-pyrrolidone, dimethyl sulfoxide and N,N-dimethylacetamide. The pure water permeability of this membrane and the percentage cut-off of the polystyrene latex (particle diameter of 0.22 μm) were 19,000 l/m$^2$·hr·kg/cm$^2$ and 100%, respectively. Further, the observation of the membrane structure under a scanning electron microscope revealed that the structure of the precursor porous membrane was maintained even after the oxidation treatment.

This membrane was immersed at room temperature in various organic solvents, acids and alkalis for 5 days to evaluate its solvent resistance. For organic solvents that have poor compatibility with water, the evaluation was conducted by the solvent substitution method wherein use was made of ethanol, dimethyl ether, or the like, and the membrane was immersed in the organic solvent after the membrane was completely wetted with the organic solvent. In the evaluation, the water permeability and separation performance of the solute were measured before and after immersion in the organic solvent to determine whether its performance deteriorated. The results are given in Table 1. The results confirmed that the porous membrane underwent no change and had excellent solvent resistance.

An aromatic polyphenylene sulfone porous membrane was prepared in the same manner as that of Example 9, except that in the oxidation treatment the time for immersion in the peracetic acid solution was changed to 1 hr and 2 hr. The membranes, thus prepared, were porous membranes comprising an aromatic polyphenylene sulfone wherein at least 80% and at least 85% of sulfur-containing functional groups contained therein were a sulfone group. None of the membranes dissolved in organic solvents such as dimethylsulfoxide.

EXAMPLE 11

Aromatic polyphenylene sulfone porous membranes wherein at least 51% and at least 60% of sulfur-containing functional groups contained therein were a sulfone group were prepared in a manner similar to that of Example 9. Instead of the oxidation treatment conducted in Example 9, the aromatic polythiol sulfone porous membrane was immersed at 35° C. for 3 hr in solutions prepared by mixing 30% by weight of aqueous hydrogen peroxide with glacial acetic acid in weight ratios of 1:1 and 1:2 and then sufficiently washed with water.

EXAMPLE 12

An aromatic polyphenylene sulfone porous membrane wherein at least 85% of sulfur-containing functional groups contained therein was a sulfone group was prepared in a manner similar to that of Example 9. Instead of the oxidation treatment conducted in Example 9, the aromatic polythiol sulfone porous membrane was immersed at room temperature in methanol only for 20 min and then similarly subjected to an oxidation treatment with a peracetic acid solution.

EXAMPLE 13

An aromatic polyphenylene sulfone porous membrane was prepared in a manner similar to that of Example 9. In this example, in the oxidation treatment the porous membrane was immersed in an ethyl acetate solution containing 10 parts by weight of peracetic acid at 40° C. for 3 hr. The membrane, thus prepared, was a porous membrane comprising an aromatic polyphenylene sulfone wherein 94% or more of the sulfur-containing groups contained therein was a sulfone group. This membrane did not dissolve in an organic solvent, such as dimethylsulfoxide, and did not melt at 400° C., i.e., had very excellent solvent resistance and heat resistance.

EXAMPLE 14

A 225 μm-thick fabric-backed aromatic polyphenylene sulfone porous membrane was prepared in a manner similar to that of Example 9. In this example, polyester unwoven fabric having a thickness of 130 μm was used instead of the glass plate used in Example 9. The membrane sample was placed in an autoclave and then treated with hot water at 130° C. for 1 hr. As a result, no change was observed in the shape and separation properties of the membrane, i.e., the results confirmed that the membrane had an excellent heat resistance.

EXAMPLE 15

14 parts by weight of the aromatic polythioether sulfone, prepared in Referential Example 1, and 2 parts by weight of polyethylene oxide having an average molecular weight of 900,000 (a product of Aldrich) were dissolved in 84 parts by weight of N-methyl-2-pyrrolidone at room temperature, while stirring, to prepare a homogeneous polymer solution. This solution was extruded together with an internal coagulating solution comprising an aqueous solution of 50 parts by weight of N-methyl-2-pyrrolidone through a double-tube nozzle to spin a hollow fiber membrane by the dry-and-wet method. In this example, the drying distance was 10 cm and an aqueous solution of 60 parts by weight of N-methyl-2-pyrrolidone was used at 40° C. as an external coagulating solution. The inner and outer diameters of the hollow fiber membrane, thus prepared, were 0.35 mm and 0.5 mm, respectively. The observation of the membrane structure under a scanning electron microscope revealed that the internal surface had pores with a maximum diameter of 0.3 μm, the external surface had pores with a maximum diameter of 0.6 μm and the inside had a network structure with an average pore diameter of 0.4 μm. The pure water permeability of (particle diameter of 0.43 μm) were 18,000 l/m$^2$·hr·kg/cm$^2$ and 100%, respectively. This porous membrane was subjected to the same oxidation treatment as that of Example 9 to prepare a porous membrane of an aromatic polyphenylene sulfone wherein 92% or more of the sulfur-containing functional groups contained therein were sulfone percentage cut-off of polystyrene latex (particle diameter of the percentage cut-off of polystyrene latex (particle diameter of 0.43 μm) were 17,000 l/m$^2$·hr·kg/cm$^2$ and 100%, respectively. The observation of the membrane structure under a scanning electron microscope revealed that the structure of the precursor porous membrane was maintained even after the oxidation treatment.

The solvent resistance of the hollow fiber membrane, thus prepared, was evaluated in the same manner as that of Example 9. The results confirmed that the hollow fiber membrane underwent no change, i.e., had an excellent solvent resistance.

COMPARATIVE EXAMPLE 3

A fine filtration membrane of polyether sulfone was prepared according to Example 2 described in Japanese Patent Laid-Open No. 197006/1986. The pure water permeability of the membrane and the percentage cut-off of the polystyrene latex (particle diameter of 0.22 μm) were 14,000 l/m$^2$·hr·kg/cm$^2$ and 100%, respectively. This membrane was immersed in various solvents, acids and alkalis at room temperature for 5 days in the same manner as that of Example 9 to evaluate the solvent resistance. The results are given in Table 1. The membrane could not withstand practical use as an organic solvent-resistant membrane because it dissolved in aprotic polar organic solvents, such as N,N-dimethylacetamide, N-methyl-2-pyrrolidone and dimethyl sulfoxide and deteriorated even when immersed in general organic solvents such as acetone, benzene and chloroform.

TABLE 1

| | Solvent resistance test | |
|---|---|---|
| | Results of immersion | |
| Solvent | Ex. 1 Ex. 9 | Comp. Ex. 2 Comp. Ex. 3 |
| ethyl ether | ⊙ | ⊙ |
| dioxane | ⊙ | X |
| tetrahydrofuran | ⊙ | X |
| methyl Cellosolve | ⊙ | O |
| cyclohexanone | ⊙ | X |
| acetic acid | ⊙ | O |
| trichloroethylene | ⊙ | X |
| ethyl acetate | ⊙ | Δ |
| morpholine | ⊙ | X |
| aniline | ⊙ | Δ |
| conc. nitric acid | O | Δ |
| conc. hydrochloric acid | ⊙ | O |
| benzene | ⊙ | Δ |
| methylene chloride | ⊙ | X |
| acetone | ⊙ | X |
| chloroform | ⊙ | X |
| chlorobenzene | ⊙ | Δ |
| ethanol | ⊙ | ⊙ |
| pyridine | ⊙ | X |
| dimethyl sulfoxide | ⊙ | X |
| N,N-dimethylacetamide | ⊙ | X |
| N-methyl-2-pyrrolidone | ⊙ | X |
| 5% aqueous sodium hydroxide solution | O | O |

Note: Evaluation of membrane:
⊙: the membrane exhibited no change.
O: the membrane was usable although a small influence was observed.
Δ: the membrane was usable only for a short period of time although an influence was observed.
X: the membrane was unusable.

EXAMPLE 16

The porous membrane prepared in Example 1 was immersed in a 2% by weight aqueous m-phenylenediamine solution at room temperature for 2 hr. Subsequently, excess aqueous m-phenylenediamine solution was removed from the surface of the porous membrane. The porous membrane was then immediately immersed in a solution of 0.1% by weight of trimesoyl chloride in n-hexane at room temperature for 10 sec to complete an interfacial polymerization, thereby coating the surface of the porous membrane with an active layer. The resultant membrane was subjected to a reverse osmosis test by making use of a 0.5% aqueous NaCl solution under a pressure of 42 kg/cm$^2$ at a temperature of 25° C. It was found that the percentage salt removal and the water permeability were 99.5% and 1.1 day, respectively.

REFERENTIAL EXAMPLE 2

A 1-l SUS 316 flask equipped with an agitator, a gas inlet tube, a thermometer and a condenser having a receiver at its tip was charged with 126.80 g of 4-hydroxythiophenol, 287.25 g of 4,4-dichlorodiphenyl sulfone, 276.70 g of anhydrous sodium sulfate and 1260 g of N,N-dimethylacetamide, followed by purging with nitrogen. Agitation and temperature rise were started in a nitrogen atmosphere. The temperature in the system was raised to 165.C over a period of 30 min. The reaction was allowed to proceed at that temperature for about 6 hr. 10.05 g of water was deposited in the receiver during the period.

After the reaction, the temperature of the reaction mixture was lowered to 100° C. Then a methyl chloride gas was blown into the system at a flow rate of 1,500 ml/min for 2 hr while maintaining the temperature to stop the reaction.

Then, potassium chloride formed as a by-product during the reaction and excess potassium carbonate were filtered off. The filtrate was poured into 15 l of methanol, and the resultant polymer was precipitated and ground with a homogenizer. The ground polymer was collected by filtration and poured into 15 l of fresh methanol to extract N,N-dimethylacetamide. Solvent extraction with methanol was repeated four times to remove N,N-dimethylacetamide from the polymer. The polymer was centrifuged to remove methanol and heat-dried at 150° C. in vacuum. The bulk density of the polymer after drying was 0.13 g/cm³. This polymer will be referred to as polymer (A).

POLYMER EXAMPLE 1

20.00 g of polymer (A) was poured into a mixture of 9.4 g of peracetic acid with 180 g of ethyl acetate at room temperature while agitating. A temperature rise due to an exothermic reaction was observed immediately after the polymer was fed. The maximum temperature reached 45° C. The reaction was allowed to proceed for 3 hr after the polymer was fed. The polymer was in a solid state during the reaction. The reaction of the polymer proceeded in a solid state. The polymer was collected by filtration. Then, washing with 200 ml of methanol was repeated four times to extract and remove peracetic acid, acetic acid and ethyl acetate from the polymer. The collected polymer was heat-dried in vacuum or at 150° C. The polymer, thus prepared, will be referred to as polymer (B). The yield of polymer (B) was 21.81 g. The average value of the —$SO_x$— group was 1.91. The comparison of the properties of polymer (B) of the present invention with those of the starting polymer (A) was given in Table 2.

TABLE 2

| Sample | *1 Reduced viscosity | *2 Glass transition point | *3 Decomposition temp. | *4 Molding indicator temp. |
|---|---|---|---|---|
| polymer (A) | 0.53 | 187 | 483 | 320 |
| polymer | 0.58 | 251 | 487 | 376 |

Note:
*1 Reduced viscosity: 0.5 g of a sample was dissolved N-methylpyrrolidone in a total volume of 100 ml. The viscosity was measured at 30° C. by means of a Ubbelohde's viscometer.
*2 Glass transition point: Measured at a temperature rise rate of 10° C./min by means of DSC.
*3 Decomposition temperature: The temperature was raised by means of a thermobalance in an air atmosphere at a temperature rise rate of 20° C./min. The temperature at which the weight of the sample decreased by 2.5% was defined as the decomposition temperature.
*4 Molding indicator temperature: Defined as the temperature at which the sample exhibited a viscosity of 10,000 P when measured by means of a flow tester (manufactured by Shimadzu Seisakusho Ltd.).

As is apparent from the Table 2, the polymer of the present invention exhibited a glass transition point much higher than that of the starting polymer (A). This result substantiates the fact that the polymer of the present invention is excellent in heat resistance.

Figure 3:
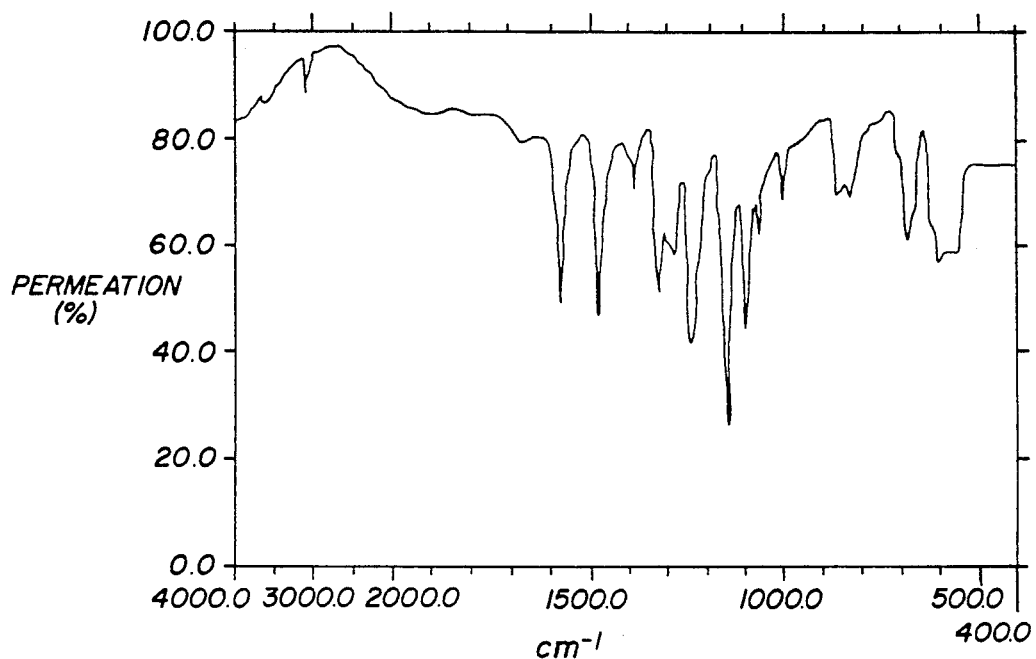
FIG. 3 is a diagram showing an infrared absorption spectrum of the polymer of the present invention prepared in Polymer Example 1.
Figure 4:
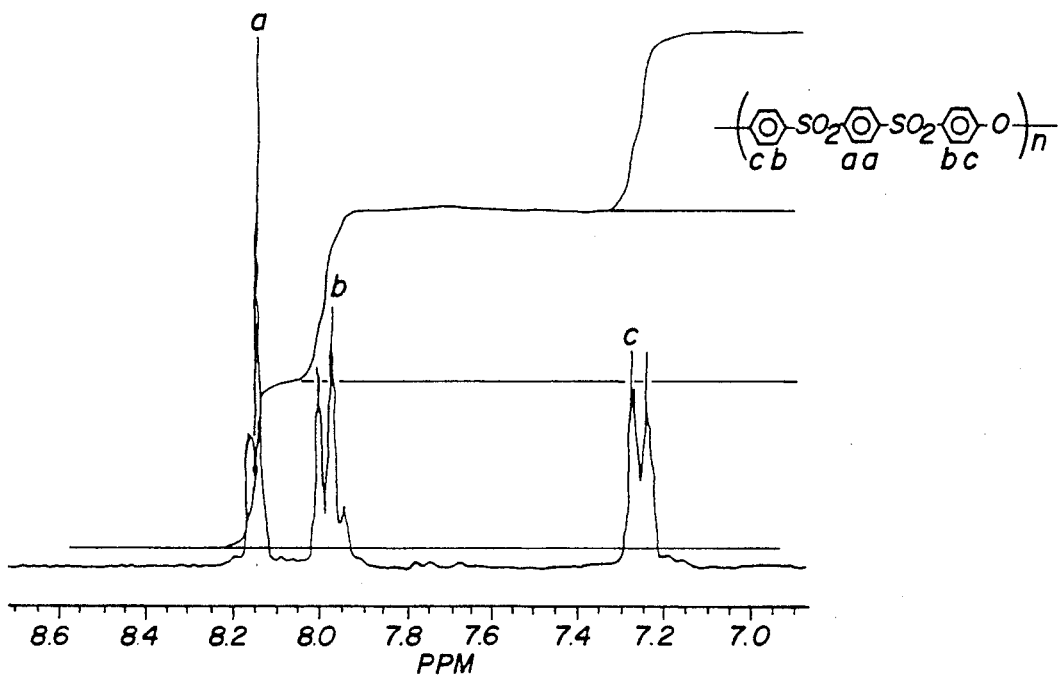
FIG. 4 is a diagram showing proton nuclear magnetic resonance spectrum of the same polymer.
Figure 5:
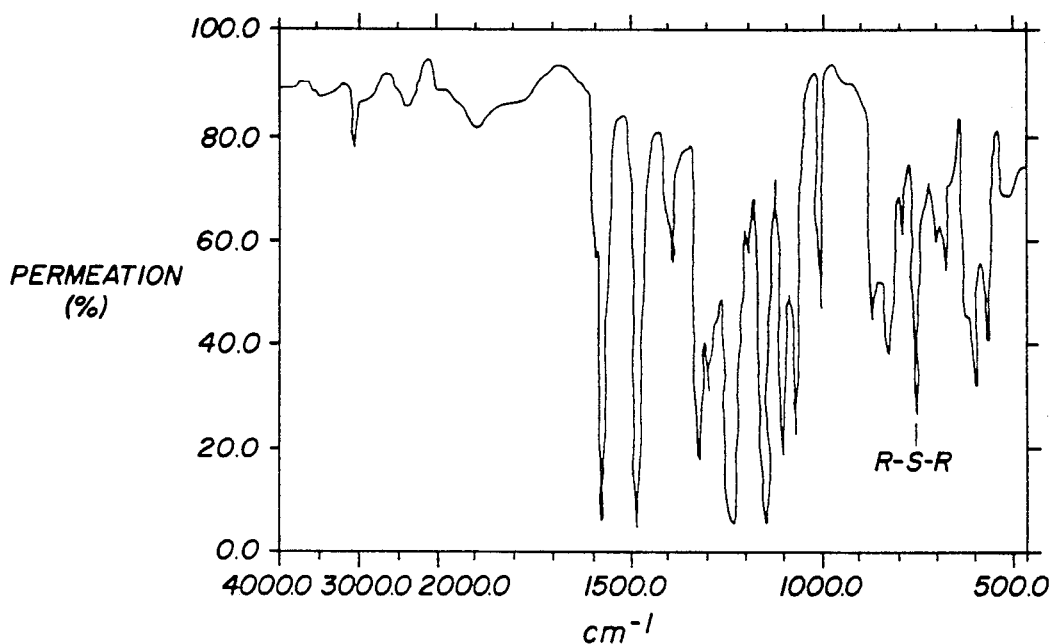
FIG. 5 is an infrared absorption spectrum of a starting polymer prepared in Synthesis Example 2.
Figure 6:
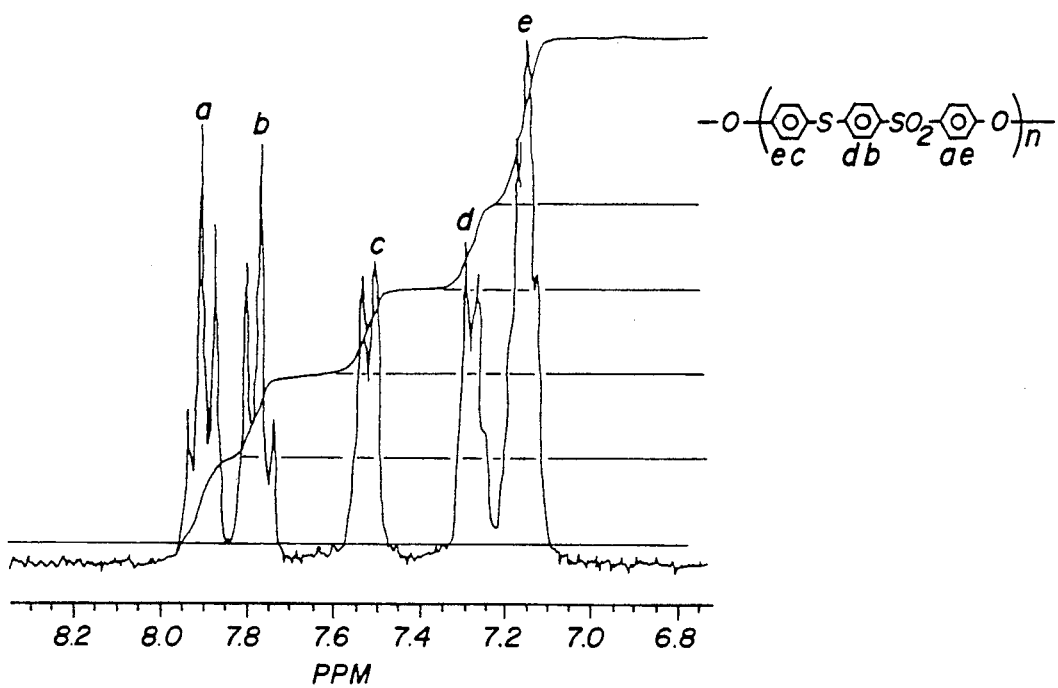
FIG. 6 is a proton nuclear magnetic resonance spectrum of a starting polymer prepared in Synthesis Example 2.

An infrared absorption spectrum of polymer (B), a proton nuclear resonance spectrum of polymer (B) and an infrared absorption spectrum of the starting polymer (A) prepared in the Synthesis Example are shown in FIG. 3, FIG. 4 and FIG. 5, respectively. It is apparent that absorptions at about 755 cm$^{-1}$ and about 768 cm$^{-1}$ assignable to a thioether bond observed in the starting polymer shown in FIG. 5 disappeared in polymer (B) of the present invention as shown in FIG. 3.

When polymer (B) was press molded at 376° C., an excellent molding resulted.

POLYMER EXAMPLE 2

20.00 g of polymer (A) was dissolved in 180 g of N-methyl-2-pyrrolidone. A mixture of 9.4 g of peracetic acid with 31 g of ethyl acetate was dropped thereinto over a period of 20 min. A temperature rise due to the reaction was observed. The reaction was allowed to proceed for 3 hr while holding the internal temperature at 30° C. The polymer was in a homogeneous solution from the beginning of the reaction and throughout the completion of the reaction. After the completion of the reaction, the polymer was poured into 2 l of methanol, precipitated and then ground by means of a homogenizer. The ground polymer was collected by filtration and poured into 2 l of fresh methanol to extract and remove N-methyl-2-pyrrolidone, acetic acid, ethyl acetate, and the like. This procedure was further repeated twice. The polymer collected by filtration was dried at 150° C. in vacuum.

The polymer, thus prepared, will be referred to as polymer (C). The yield of polymer (C) was 21.86 g. The average value of x in the —$SO_x$— group was 1.98. The reduced viscosity, glass transition point, decomposition temperature and molding indicator temperature of polymer (C) were 0.58, 252° C., 489° C. and 378° C., respectively.

When polymer (C) was press molded at 378° C., an excellent molding resulted.

POLYMER EXAMPLE 3

20.00 g of polymer (A) was poured into a mixture of 18.8 g of peracetic acid with 180 g of ethyl acetate at room temperature while agitating. The reaction was allowed to proceed for 3 hr after the feeding of the polymer, and the polymer was purified and dried in the same manner as that of Polymer Example 1. The polymer, thus prepared, will be referred to as polymer (D). The yield of polymer (D) was 21.84 g. The average value of X in the —SO$_x$— group was 1.98. The glass transition point of polymer (D) was 252° C. When this polymer was press molded at 378° C., an excellent molding resulted.

POLYMER EXAMPLE 4

A polymer was prepared in a manner similar to that of Polymer Example 1. In this example, 20.00 g of polymer (A) was poured into a mixture of 7.05 g of peracetic acid with 180 g of ethyl acetate. The polymer, thus prepared, will be referred to as polymer (E). The yield of polymer (E) was 21.41 g. The average value of X in the —SO$_x$— group was 1.50. The glass transition point of polymer (E) was 240° C. When this polymer was press molded at 365° C., an excellent molding resulted.

COMPARATIVE EXAMPLE 4

A polymer was prepared in a manner similar to that of Polymer Example 1. In this example, 20.00 g of polymer (A) was poured into a mixture of 5.5 g of peracetic acid with 180 g of ethyl acetate. The polymer, thus prepared, will be referred to as polymer (F). The yield of polymer (F) was 21.15 g. The average value of X in the —SO$_x$— group was 1.22. The glass transition point of polymer (F) was 230° C. When this polymer was press molded at 350° C., the resultant molding turned blackish brown and was fragile, so that it was unsuitable for practical use.

COMPARATIVE EXAMPLE 5

A polymer was prepared in a manner similar to that of Polymer Example 1. In this example, 20.00 g of polymer (A) was poured into a mixture of 2.4 g of peracetic acid with 180 g of ethyl acetate. The polymer, thus prepared, will be referred to as polymer (G). The yield of polymer (G) was 20.47. The average value of X in the —SO$_x$— group was 0.50. The glass transition point of polymer (G) was 221° C. When this polymer was press molded at 341° C., the resultant molding turned black and could not be taken out of the mold because it was fragile and cracked.

REFERENTIAL EXAMPLE 3

A 1-l flash equipped with an agitator, a nitrogen inlet tube, a thermometer and a condenser having a receiver was charged with 1.42 g of 1,4-benzenedithiol, 47,56 g of 4,4'-dihydroxydiphenyl sulfone, 59.14 g of 4,4'-dichlorodiphenyl sulfone, 22.3 g of anhydrous sodium carbonate and 190 g of sulfonlane. A nitrogen gas was introduced thereinto under agitation to purge the reaction system with nitrogen.

Then, the temperature of the system was raised to 235° C. and the agitation was continued for 5 hr. The temperature was lowered to 150° C. and 200 g of sulfolane was added thereto. A methyl chloride gas was blown into the system for 1 hr at a rate of 300 ml/min to complete the reaction. A solid was removed from the reaction mixture by filtration. The filtrate was poured into methanol to precipitate the formed polymer. The precipitate was further washed with methanol and dried to prepare an intended polymer in a yield of 94%.

Infrared absorption spectroscopy and proton nuclear magnetic resonance spectroscopy of the polymer, thus prepared, revealed that the polymer was an aromatic polythioether sulfone polymer substantially composed of the following repeating units and having an m/n value of 1/19:

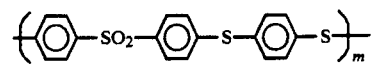

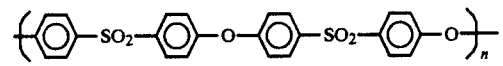

This polymer had a reduced viscosity of 0.51 dl/g as determined at 25° C. in a 0.5 g/dl solution of N-methyl-2-pyrrolidone and a glass transition point of 220° C. as determined by differential scanning calorimetry.

REFERENTIAL EXAMPLE 4

An experiment was conducted in the same manner as that of Referential Example 3, except that the amounts of 1,4-benzenedithiol and 4,4'-dihydroxydiphenyl sulfone were varied to 2.85 g and 45.05 g, respectively.

The yield of the polymer was 95%. The infrared absorption spectroscopy and proton nuclear magnetic resonance spectroscopy of the polymer, thus prepared, revealed that the polymer was an aromatic polythioether sulfone polymer substantially composed of the following repeating units and having an m/n value of 1/9:

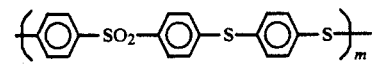

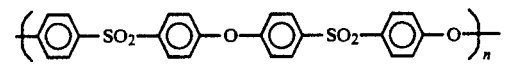

This polymer had a reduced viscosity of 0.51 d/g as determined at 25° C. in a 0.5 g/dl solution of N-methyl-2-pyrrolidone and a glass transition point of 220° C. as determined by differential scanning calorimetry.

REFERENTIAL EXAMPLE 5

An experiment was conducted in the same manner as that of Referential Example 3, except that the amounts of 1,4-benzenedithiol and 4,4'-dihydroxydiphenyl sulfone varied to 5.68 and 40.00 g, respectively.

The yield of the polymer was 96%. The infrared absorption spectroscopy and proton nuclear magnetic resonance spectroscopy of the polymer, thus prepared, revealed that the polymer was an aromatic polythioether sulfone polymer substantially composed of the following repeating units and having an m/n value of 1/4:

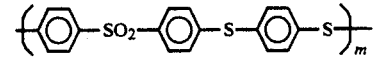

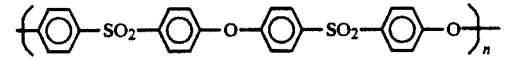

This polymer had a reduced viscosity of 0.49 dl/g as determined at 25° C. in a 0.5 g/dl solution of N-methyl-2-pyrrolidone and a glass transition point of 217° C. as determined by differential scanning calorimetry.

REFERENTIAL EXAMPLE 6

An experiment was conducted in the same manner as that of Referential Example 3, except that the amounts of 1,4-benzenedithiol and 4,41-dihydroxydiphenyl sulfone were varied to 9.47 g and 33.33 g, respectively.

The yield of the polymer was 96%. The infrared absorption spectroscopy and proton nuclear magnetic resonance spectroscopy of the polymer, thus prepared, revealed that the polymer was an aromatic polythioether sulfone polymer substantially composed of the following repeating units and having an m/n value of ½:

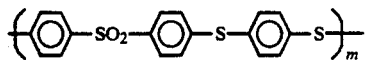

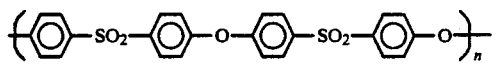

This polymer had a reduced viscosity of 0.49 dl/g as determined at 25° C. in a 0.5 g/dl solution of N-methyl-2-pyrrolidone and a glass transition point of 211° C. as determined by differential scanning calorimetry.

REFERENTIAL EXAMPLE 7

An experiment was conducted in the same manner as that of Referential Example 3, except that the amounts of 1,4-benzenedithiol and 4,41-dihydroxydiphenyl sulfone were varied to 18.96 g and 16.67 g, respectively.

The yield of the polymer was 96%. The infrared absorption spectroscopy and proton nuclear magnetic resonance spectroscopy of the polymer, thus prepared, revealed that the polymer was an aromatic polythioether sulfone polymer substantially composed of the following repeating units and having an m/n value of 2/1:

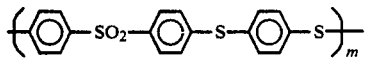

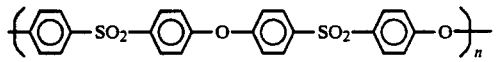

This polymer had a reduced viscosity of 0.52 dl/g as determined at 25° C. in a 0.5 g/dl solution of N-methyl-2-pyrrolidone and a glass transition point of 195° C. as determined by differential scanning calorimetry.

REFERENTIAL EXAMPLE 8

An experiment was conducted in the same manner as that of Referential Example 3, except that the amounts of 1,4-benzenedithiol and 4,41-dihydroxydiphenyl sulfone were varied to 22.75 g and 10.01 g, respectively.

The yield of the polymer was 97%. The infrared absorption spectroscopy and proton nuclear magnetic resonance spectroscopy of the polymer, thus prepared, revealed that the polymer was an aromatic polythioether sulfone polymer substantially composed of the following repeating units and having an m/n value of 4/1:

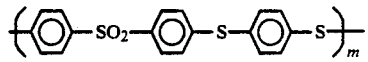

-continued

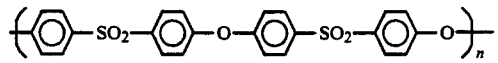

This polymer had a reduced viscosity of 0.53 dl/g as determined at 25° C. in a 0.5 g/dl solution of N-methyl-2-pyrrolidone and a glass transition point of 187° C. as determined by differential scanning calorimetry.

POLYMER EXAMPLE 5

A reactor equipped with an agitator, a thermometer and a condenser was charged with 20.4 g of a solution (peracetic acid/ethyl acetate) containing 2.5% by weight of peracetic acid. The solution temperature was adjusted to 35° C.

10.0 g of the aromatic polythioether sulfone polymer powder having an m/n value of 1/19, prepared in Referential Example 3, was gradually added to the reactor, while stirring, in such a manner that the internal temperature did not exceed 50° C. After the polymer powder was added, the reaction was allowed to proceed for 3 hr.

Subsequently, washing of the reaction mixture in 100 g of methanol, followed by filtration, was repeated thrice to remove acetic acid as a reaction by-product, in addition to peracetic acid as a reaction by-product, in addition to peracetic acid and ethyl acetate. The formed polymer was further washed with distilled water, filtered and then dried in a vacuum drier at 80° C. for 6 hr, thereby preparing an intended polymer.

The ESCA (electron spectroscopy for chemical analysis) and elementary analysis of the polymer, thus prepared, revealed that 98% of the thioether groups were oxidized into sulfone groups.

Specifically, it was confirmed that the average value of X in the following group was 1.96:

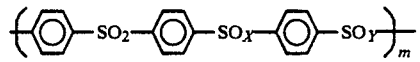

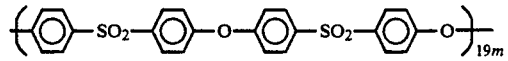

The glass transition point was 229° C. as determined by differential scanning calorimetry, i.e., by 9° C. higher than that of the polymer prepared in Referential Example 3.

When this polymer was molded into a 2 mm-thick sheet by means of a press molding machine set at 290° C., the resultant molding was transparent and tough.

POLYMER EXAMPLE 6

A reactor equipped with an agitator, a thermometer and a condenser was charged with 20.6 g of a solution (peracetic acid/ethyl acetate) containing 5.0% by weight of peracetic acid. The solution temperature was adjusted to 35° C., 10.0 g of the aromatic polythioether sulfone polymer powder having an m/n value of 1/9, prepared in Referential Example 4, was gradually added to the reactor, while stirring, in such a manner that the internal temperature did not exceed 50° C. After the polymer powder was added, the reaction was allowed to proceed for 3 hr.

Subsequently, washing of the reaction mixture in 100 g of methanol, followed by filtration, was repeated thrice to remove acetic acid as a reaction by-product, in addition to peracetic acid and ethyl acetate. The formed polymer was further washed with distilled water, filtered and then dried in a vacuum drier at 80.C for 6 hr, thereby preparing an-intended polymer.

The ESCA (electron spectroscopy for chemical analysis) and elementary analysis of the polymer, thus prepared, revealed that 97% of the thioether groups were oxidized into sulfone groups.

Specifically, it was confirmed that the average value of X in the following group was 1.94.

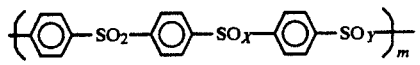

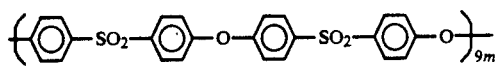

The glass transition point was 236° C. as determined by differential scanning calorimetry, i.e., by 17° C. higher than that of the polymer prepared in Referential Example 4.

When this polymer was molded into a 2 mm-thick sheet by means of a press molding machine set at 300° C., the resultant molding was transparent and tough.

POLYMER EXAMPLE 7

A reactor equipped with an agitator, a thermometer and a condenser was charged with 21.2 g of a solution (peracetic acid/ethyl acetate) containing 10.0% by weight of peracetic acid. The solution temperature was adjusted to 35° C. 10.0 g of the aromatic polythioether sulfone polymer powder having an m/n value of $\frac{1}{4}$, prepared in Referential Example 5, was gradually added to the reactor, while stirring, in such a manner that the internal temperature did not exceed 50° C. After the polymer powder was added, the reaction was allowed to proceed for 3 hr.

Subsequently, washing of the reaction mixture in 100 g of methanol, followed by filtration, was repeated thrice to remove acetic acid as a reaction by-product, in addition to peracetic acid and ethyl acetate. The formed polymer was further washed with distilled water, filtered and then dried in a vacuum drier at 80° C. for 6 hr, thereby preparing an intended polymer.

The ESCA (electron spectroscopy for chemical analysis) and elementary analysis of the polymer, thus prepared, revealed that 98% of the thioether groups were oxidized into sulfone groups.

Specifically, it was confirmed that the average value of X in the following group was 1.96:

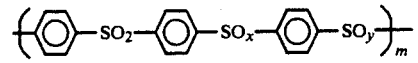

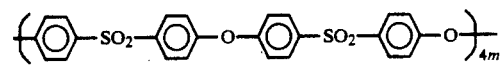

The glass transition point was 251° C. as determined by differential scanning calorimetry, i.e., by 34° C. higher than that of the polymer prepared in Referential Example 5.

When this polymer was molded into a 2 mm-thick sheet by means of a press molding machine set a 330° C., the resultant molding was transparent and tough.

POLYMER EXAMPLE 8

A reactor equipped with an agitator, a thermometer and a condenser was charged with 18.2 g of a solution peracetic acid-ethyl acetate) containing 20.0% by weight of peracetic acid. The solution temperature was adjusted to 35° C.

10.0 g of the aromatic polythioether sulfone polymer powder having an m/n value of $\frac{1}{4}$, prepared in Referential Example 6, was gradually added to the reactor, while stirring, in such a manner that the internal temperature did not exceed 50° C. After the polymer powder was added, the reaction was allowed to proceed for 3 hr.

Subsequently, washing of the reaction mixture in 100 g of methanol, followed by filtration, was repeated thrice to remove acetic acid as a reaction by-product, in addition to peracetic acid and ethyl acetate. The formed polymer was further washed with distilled water, filtered and then dried in a vacuum drier at 80° C. for 6 hr, thereby preparing an intended polymer.

The ESCA (electron spectroscopy for chemical analysis) and elementary analysis of the polymer, thus prepared, revealed that 96% of the thioether groups were oxidized into sulfone groups.

Specifically, it was confirmed that the average value of X in the following group was 1.92:

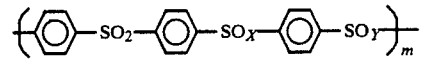

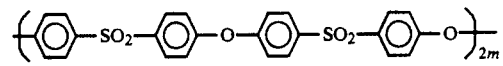

The glass transition point was 270° C. as determined by differential scanning calorimetry, i.e., by 59° C. higher than that of the polymer prepared in Referential Example 6.

When this polymer was molded into a 2 mm-thick sheet by means of a press molding machine set at 330° C., the resultant molding was transparent and tough.

COMPARATIVE EXAMPLE 6

A reactor equipped with an agitator, a thermometer and a condenser was charged with 38.8 g of a solution (peracetic acid/ethyl acetate) containing 20.0% by weight of peracetic acid. The solution temperature was adjusted to 35° C.

10.0 g of the aromatic polythioether sulfone polymer powder having an m/n value of 2/1, prepared in Referential Example 7, was gradually added to the reactor, while stirring, in such a manner that the internal temperature did not exceed 50° C. After the polymer powder was added, the reaction was allowed to proceed for 3 hr.

Subsequently, washing of the reaction mixture in 100 g of methanol, followed by filtration, was repeated thrice to remove acetic acid as a reaction by-product, in addition to peracetic acid and ethyl acetate. The formed polymer was further washed with distilled water, filtered and then dried in a vacuum drier at 80° C. for 6 hr, thereby preparing an intended polymer.

The ESCA (electron spectroscopy for chemical analysis) and elementary analysis of the polymer, thus prepared, revealed that 96% of the thioether groups were oxidized into sulfone groups.

Specifically, it was confirmed that the average value of X in the following group was 1.90:

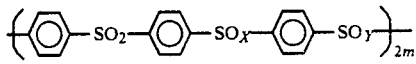

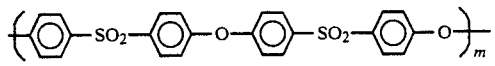

The glass transition point was 319° C. as determined by differential scanning calorimetry, i.e., by 124° C. higher than that of the polymer prepared in Referential Example 7.

When this polymer was molded into a 2 mm-thick sheet by means of a press molding machine set at 370° C., a blackish brown spot was partially formed and the resultant sheet was fragile.

COMPARATIVE EXAMPLE 7

A reactor equipped with an agitator, a thermometer and a condenser was charged with 32.2 g of a solution (peracetic acid/ethyl acetate) containing 30.0% by weight of peracetic acid. The solution temperature was adjusted to 35° C.

10.0 g of the aromatic polythioether sulfone polymer powder having an m/n value of 4/1, prepared in Referential Example 8, was gradually added to the reactor, while stirring, in such a manner that the internal temperature did not exceed 50° C. After the polymer powder was added, the reaction was allowed to proceed for hr.

Subsequently, washing of the reaction mixture in 100 g of methanol, followed by filtration, was repeated thrice to remove acetic acid as a reaction by-product, in addition to peracetic acid and ethyl acetate. The formed polymer was further washed with distilled water, filtered and then dried in a vacuum drier at 80° C. for 6 hr, thereby preparing an intended polymer. The ESCA (electron spectroscopy for chemical analysis) and elementary analysis of the polymer, thus prepared, revealed that 97% of the thioether groups were oxidized into sulfone groups.

Specifically, it was confirmed that the average value of X in the following group was 1.94:

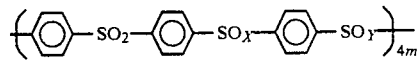

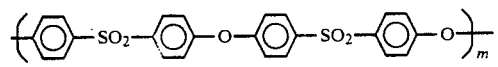

The glass transition point was 338° C. as determined by differential scanning calorimetry, i.e., by 151° C. higher than that of the polymer prepared in Referential Example 8.

When the polymer was molded into a 2 mm-thick sheet by means of a press molding machine set at 390° C., a blackish brown spot was partially formed and the resultant sheet was fragile.

POLYMER EXAMPLE 9

10 g of the polymer powder, prepared in Referential Example 1, was gradually added to 35 g of an ethyl acetate solution containing 2.5% by weight of peracetic acid, while stirring, in such a manner that the internal temperature did not exceed 50° C. After the polymer powder was added, the reaction was allowed to proceed for 3 hr while holding the internal temperature to between 35° and 50° C. After the completion of the re-action, the polymer was collected by filtration. Then, the polymer was washed with 30-fold as much methanol and collected by filtration. The collected polymer powder was washed twice with 30-fold as much distilled water, dehydrated and then dried in a vacuum at 80° C. for 6 hr, thereby preparing an intended polymer powder.

The ESCA (electron spectroscopy for chemical analysis) and elementary analysis of the polymer, thus prepared, revealed that 9% of the thioether group was oxidized into sulfone groups.

The glass transition point of the polymer was determined by differential scanning calorimetry and found to be 198° C.

When this polymer was molded into a 2 mm-thick sheet by means of a press molding machine set at 260° C., the resultant sheet was transparent and tough.

POLYMER EXAMPLE 10

10 g of the polymer powder, prepared in Referential Example 1, was gradually added to 35 g of an ethyl acetate solution containing 5% by weight of peracetic acid, while stirring, in such a manner that the internal temperature did not exceed 50° C. After the addition of the polymer powder was completed, the reaction was allowed to proceed for 3 hr while holding the internal temperature to between 35° and 50° C. After the completion of the reaction, the polymer was collected by filtration. Then, the polymer was washed with 30-fold as much methanol and collected by filtration. The collected polymer powder was washed twice with 30-fold as much distilled water, dehydrated and then dried in a vacuum at 80° C. for 6 hr, thereby preparing an intended polymer powder.

The ESCA (electron spectroscopy for chemical analysis) and elementary analysis of the polymer, thus prepared, revealed that 19% of the thioether groups were oxidized into sulfone groups.

The glass transition point of the polymer was determined by differential scanning calorimetry and found to be 218° C.

When this polymer was molded into a 2 mm-thick sheet by means of a press molding machine set at 260° C., the resultant sheet was transparent and tough.

POLYMER EXAMPLE 11

10 g of the polymer powder, prepared in Referential Example 1, was gradually added to 52 g an ethyl acetate solution containing 5% by weight of peracetic acid, while stirring, in such a manner that the internal temperature did not exceed 50° C. After the addition of the polymer powder was completed, the reaction was allowed to proceed for 3 hr while holding the internal temperature to between 35° and 50° C. After the completion of the reaction, the polymer was collected by filtration. Then, the polymer was washed with 30-fold as much methanol and collected by filtration. The collected polymer powder was washed twice with 30-fold as much distilled water, dehydrated and then dried in a vacuum at 80° C. for 6 hr, thereby preparing an intended polymer powder.

The ESCA (electron spectroscopy for chemical analysis) and elementary analysis of the polymer, thus prepared, revealed that 30 of the thioether groups were oxidized into sulfone groups.

The glass transition point of the polymer was determined by differential scanning calorimetry and found to be 241° C.

When this polymer was molded into a 2 mm-thick sheet by means of a press molding machine set at 290° C., the resultant sheet was transparent and tough.

POLYMER EXAMPLE 12

10 g of the polymer powder, prepared in Referential Example 2, was gradually added to 86 g of an ethyl acetate solution containing 5% by weight of peracetic acid, while stirring, in such a manner that the internal temperature did not exceed 50° C. After the addition to proceed for 3 hr while holding the internal temperature to between 35° and 50° C. After the completion of the reaction, the polymer was collected by filtration. Then, the polymer was washed with 30-fold as much methanol and collected by filtration. The collected polymer powder was washed twice with 30-fold as much distilled water, dehydrated and then dried in a vacuum at 80° C. for 6 hr, thereby preparing an intended polymer powder.

The ESCA (electron spectroscopy for chemical analysis) and elementary analysis of the polymer, thus prepared, revealed that 47% of the thioether groups were oxidized into sulfone groups.

The glass transition point of the polymer was determined by differential scanning calorimetry and found to be 275° C.

When this polymer was molded into a 2 mm-thick sheet by means of a press molding machine set at 330° C. the resultant sheet was transparent and tough.

POLYMER EXAMPLE 13

10 g of the polymer powder, prepared in Referential Example 1, was gradually added to 130 g of an ethyl acetate solution containing 5% by weight of peracetic acid, while stirring, in such a manner that the internal temperature did not exceed 50° C. After the addition of the polymer powder was completed, the reaction was allowed to proceed for 3 hr while holding the internal temperature to between 35° and 50° C. After the completion of the reaction, the polymer was collected by filtration. Then, the polymer was washed with 30-fold as much methanol and collected by filtration. The collected polymap powder was washed twice with 30-fold as much distilled water, dehydrated and then dried in a vacuum at 80° C. for 6 hr, thereby preparing an intended polymer powder.

The ESCA (electron spectroscopy for chemical analysis) and elementary analysis of the polymer, thus prepared, revealed that 75% of the thioether groups were oxidized into sulfone groups.

The glass transition point of the polymer was determined by differential scanning calorimetry and found to be 330° C.

When this polymer was molded into a 2 mm-thick sheet by means of a press molding machine set at 380° C., the resultant sheet was transparent and tough.

POLYMER EXAMPLE 14

10 g of the polymer powder, prepared in Referential Example 1, was gradually added to 86 g of an ethyl acetate solution containing 10% by weight of peracetic acid, while stirring, in such a manner that the internal temperature did not exceed 50° C. After the addition of the polymer powder was completed, the reaction was allowed to proceed for 3 hr while holding the internal temperature to between 35° and 50° C. After the completion of the reaction, the polymer was collected by filtration. Then, the polymer was washed with 30-fold as much methanol and collected by filtration. The collected polymer powder was washed twice with 30-fold as much distilled water, dehydrated and then dried in a vacuum at 80° C. for 6 hr, thereby preparing an intended polymer powder.

The ESCA (electron spectroscopy for chemical analysis) and elementary analysis of the polymer, thus prepared, revealed that 96% of the thioether groups were oxidized into sulfone groups.

The glass transition point of the polymer was determined by differential scanning calorimetry and found to be 377° C.

When this polymer was molded into a 2 mm-thick sheet by means of a press molding machine set at 420° C., the resultant sheet was transparent and tough.

POLYMER EXAMPLE 15

10 g of the polymer powder, prepared in Referential Example 1, was gradually added to 86 g of an ethyl acetate solution containing 20% by weight of peracetic acid, while stirring, in such a manner that the internal temperature did not exceed 50° C. After the addition of the polymer powder was completed, the reaction was allowed to proceed for 3 hr while holding the internal temperature to between 35° and 50° C. After the completion of the reaction, the polymer was collected by filtration. Then, the polymer was washed with 30-fold as much methanol and collected by filtration. The collected polymer powder was washed twice with 30-fold as much distilled water, dehydrated and then dried in a vacuum at 80° for 6 hr, thereby preparing an intended polymer powder.

The ESCA (electron spectroscopy for chemical analysis) and elementary analysis of the polymer, thus prepared, revealed that 98% of the thioether groups were oxidized into sulfone groups.

The glass transition point of the polymer was determined by differential scanning calorimetry and found to be 385° C.

When this polymer was molded into a 2 mm-thick sheet by means of a press molding machine set at 425° C., the resultant sheet was transparent and tough.

We claim:

1. A process for preparing a modified porous membrane which comprises:
   dissolving an aromatic polymer having a thioether in an organic solvent;
   forming a membrane of said aromatic polymer from the resultant solution by phase conversion; and
   oxidizing the formed membrane in the presence of an aprotic organic solvent system having a strong affinity for the polymer in the substantial absence of water to thereby provide sufficient oxidation to the membrane.

2. A process according to claim 1, wherein said aromatic polymer is dissolved together with another polymer in an organic solvent to prepare a membrane comprising said aromatic polymer and said other polymer.

3. A process according to claim 1, wherein the oxidation is conducted by liquid phase oxidation with a percarboxylic acid or an oxidation agent system capable of forming a percarboxylic acid in a solvent which does not dissolve said aromatic polymer.

4. A process according to claim 1, wherein the membrane is stabilized with a nonsulfur reducing agent after the oxidation.

5. A process according to claim 1, wherein the membrane prepared by phase conversion has such an asymmetric cross-sectional structure in the direction of its thickness that at least one surface of the membrane has a dense layer having a thickness of 10 μm or less and comprising micropores having an average pore diameter of 1 μm or less and the inside of the membrane has at least one porous layer having an average pore diameter at least twice larger than that of the dense layer and a thickness at least twice larger than that of the dense layer.

6. A process according to claim 1, wherein the membrane prepared by phase conversion has such a cross-sectional structure in the direction of its thickness that both surfaces have micropores having a maximum pore diameter of 0.05 μm or more and the inside thereof has a network structure.

7. A process according to claim 1, wherein the aromatic polymer is mainly composed of repeating units represented by the general formula:

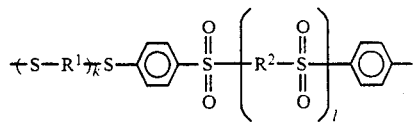

wherein $R^1$ and $R^2$ are each a phenylene or a diphenylene group, k is 0 or an integer of 1 to 10 and l is 0 or 1.

8. A process according to claim 1, wherein the aromatic polymer comprise repeating units represented by an of the following formulae (a) to (c):

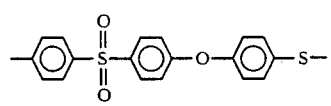  (a)

and

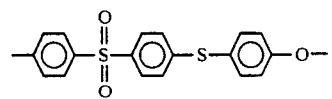

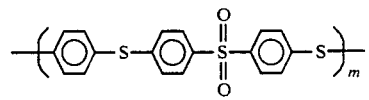  (b)

and

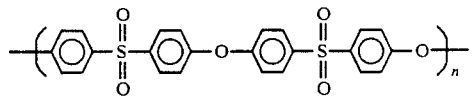

wherein $1 \leq \frac{m \times 100}{m + n} \leq \frac{200}{3}$,

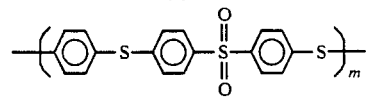  (c)

wherein m is an integer of 100 or less.

9. A modified porous membrane prepared by a process according to claim 1.

10. A membrane according to claim 9, which is substantially insoluble in an organic solvent.

11. A membrane according to claim 9, wherein the aromatic polymer of the membrane subjected to the oxidation comprises repeating units represented by the general formula:

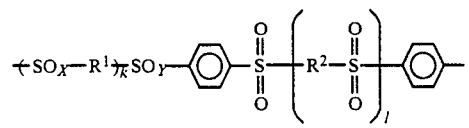

wherein $R^1$ and $R^2$ are each a phenylene group or a diphenylene group, X and Y are each 0, 1 or 2, k is 0 or an integer of 1 to 10 and l is 0 or 1, provided that a plurality of X's may be independently different numbers, and the content of the sulfone group among $SO_X$- group and $SO_Y$ group is at least equivalent to the total content of the thioether group and the sulfoxide group.

12. A membrane according to claim 9, wherein the aromatic polymer of the membrane subjected to the oxidation comprises repeating units represented by any of the formulae (d) to (f):

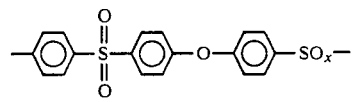

and

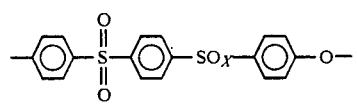

wherein X is 0, 1 or 2 and the average value of X is 1.5 or more,

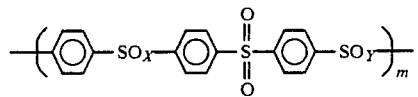  (c)

and

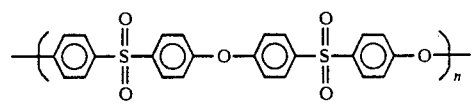

wherein X and Y are 0, 1 or 2 and the average values of X and Y are each 1.5 or more and $1 \leq \frac{m \times 100}{m + n} \leq \frac{200}{3}$,

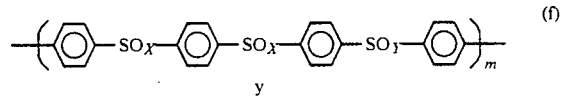  (f)

wherein X and Y are each 0, 1 or 2 and the average values of X and Y are each 1.5 or more and m is an integer of 100 or less.

13. A membrane according to claim 9 which is a flat membrane, a cylindrical membrane or a hollow fiber membrane.

14. A support membrane for a composite membrane comprising a membrane according to claim 9.

15. A composite membrane comprising a membrane according to claim 9 and, laminated on at least one surface thereof, an active layer of an organic polymer material.

16. A filtration method wherein ultrafiltration, reverse osmosis, fine filtration, gas separation, vapor permeation or pervaporation is conducted through the use of a membrane according to claim 9.

* * * * *